(12) United States Patent
Kanda et al.

(10) Patent No.: US 10,884,137 B2
(45) Date of Patent: Jan. 5, 2021

(54) POSITION DETECTION SYSTEM, POSITION DETECTION DEVICE, POSITION DETECTION METHOD, AND SENSOR TERMINAL

(71) Applicant: FUJITSU LIMITED, Kawasaki (JP)

(72) Inventors: Kouichi Kanda, Chofu (JP); Jun-ichi Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/692,991

(22) Filed: Nov. 22, 2019

(65) Prior Publication Data

US 2020/0174138 A1  Jun. 4, 2020

(30) Foreign Application Priority Data

Nov. 29, 2018 (JP) .................. 2018-224165

(51) Int. Cl.
| | |
|---|---|
| *H04B 1/00* | (2006.01) |
| *G01S 19/30* | (2010.01) |
| *G01S 19/29* | (2010.01) |
| *G01S 19/37* | (2010.01) |
| *G01S 19/46* | (2010.01) |
| *G01S 19/25* | (2010.01) |

(Continued)

(52) U.S. Cl.
CPC .............. *G01S 19/30* (2013.01); *G01S 19/09* (2013.01); *G01S 19/235* (2013.01); *G01S 19/256* (2013.01); *G01S 19/29* (2013.01); *G01S 19/37* (2013.01); *G01S 19/46* (2013.01)

(58) Field of Classification Search
CPC ....... H04B 1/709; H04B 1/707; G01S 19/215; G01S 5/04; G01S 21/005; G01C 19/235; G01C 19/256

USPC ................ 375/150; 342/357.06, 352, 357.73
See application file for complete search history.

(56) References Cited

U.S. PATENT DOCUMENTS

| | | | | |
|---|---|---|---|---|
| 2010/0194633 A1* | 8/2010 | Yamagata | ............... | G01S 19/52 342/357.33 |
| 2011/0237277 A1 | 9/2011 | Terashima et al. | | |

(Continued)

FOREIGN PATENT DOCUMENTS

| | | |
|---|---|---|
| JP | 2000-040982 A | 2/2000 |
| JP | 2004-507766 A | 3/2004 |

(Continued)

OTHER PUBLICATIONS

Liu, J. et al., "CO-GPS: Energy Efficient GPS Sensing with Cloud Offloading", IEEE Transactions on Mobile Computing, vol. 15, No. 6, pp. 1348-1361 (Jun. 2016).

*Primary Examiner* — Khai Tran
(74) *Attorney, Agent, or Firm* — Arent Fox LLP

(57) ABSTRACT

A position detection system includes a GNSS sensor terminal that receives a satellite signal from a GNSS satellite as a snapshot, at least one relay device that receives the snapshot GNSS signal transmitted by the GNSS sensor terminal, and a calculation device that measures a position of the GNSS sensor terminal by using a code phase and a Doppler frequency of the GNSS satellite obtained from the snapshot GNSS signal, wherein the calculation device estimates an initial position of the GNSS sensor terminal by using position information of the relay device that has received the snapshot GNSS signal transmitted by the GNSS sensor terminal.

10 Claims, 35 Drawing Sheets

(51) Int. Cl.
    *G01S 19/09* (2010.01)
    *G01S 19/23* (2010.01)

(56) References Cited

U.S. PATENT DOCUMENTS

| | | | |
|---|---|---|---|
| 2012/0032846 A1* | 2/2012 | Zhao | G01S 19/36 |
| | | | 342/357.73 |
| 2014/0105252 A1 | 4/2014 | Terashima et al. | |
| 2017/0285171 A1* | 10/2017 | Ries | G01S 19/215 |
| 2019/0235088 A1* | 8/2019 | Tanaka | G01S 19/47 |
| 2019/0277972 A1* | 9/2019 | Carter | G01S 19/14 |
| 2020/0094123 A1* | 3/2020 | Walshaw | G16H 40/67 |

FOREIGN PATENT DOCUMENTS

| | | |
|---|---|---|
| JP | 2004-112482 A | 4/2004 |
| JP | 2011-523062 A | 8/2011 |
| JP | 2011-220998 A | 11/2011 |
| WO | WO-01/71375 A2 | 9/2001 |
| WO | WO-02/18968 A2 | 3/2002 |
| WO | WO-2009/149417 A1 | 12/2009 |

* cited by examiner

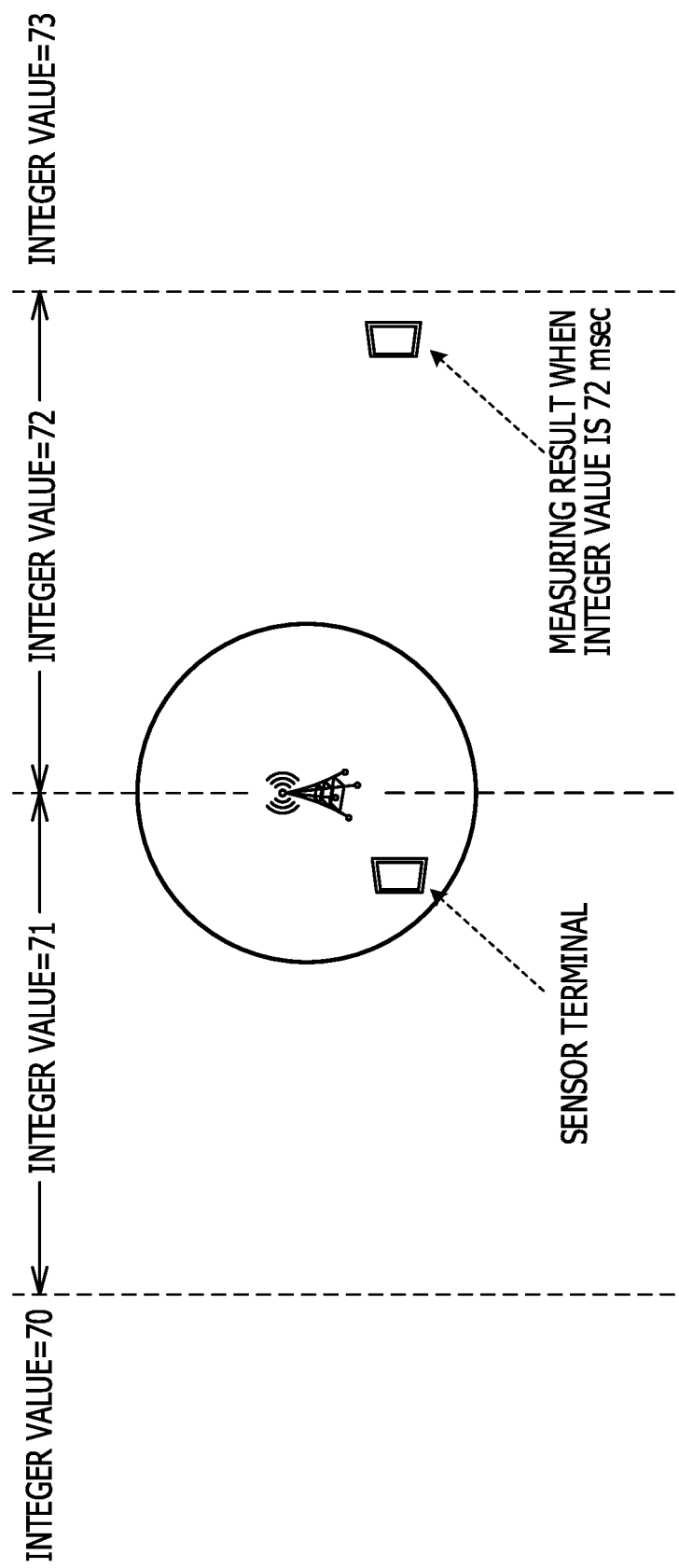

FIG. 6

| | | SINGLE MEASURING | Snapshot MEASURING | EMBODIMENT |
|---|---|---|---|---|
| MEASURING | CALCULATION PLACE | CALCULATE ALL USING TERMINAL AT HAND | CALCULATE ALL OVER CLOUD | BB PROCESSING BY TERMINAL & MEASURING IN CLOUD |
| | INTEGER VALUE | RECEIVE FRAME NUMBER | X NOT OBTAINED | OMIT BY USING LPWA BASE STATION LOCATION |
| | DECIMAL VALUE | PROCESS IN THE BASEBAND UNIT | | |
| | ACCURACY | ABOUT 10 TO 20 METERS (DETERMINE BY CALCULATION ACCURACY OF DECIMAL PART) | | |
| | PROBLEM | > 30 SECOND REQUIRED TO RECEIVE, DELAY, HIGH POWER | Shadow location (ERRONEOUS MEASURING RESULT) IS GENERATED | Shadow location NOT GENERATED |
| TERMINAL POWER | EF UNIT | HIGH (TO 110 mVW) | ABOUT 1% OF RELATED ART (1 TO 2 mV) | |
| | Dig UNIT | LARGE | NO | SMALL |
| | LPWA | - | LARGE (TO 40 kByte) | SMALL (TO 24 kByte) |

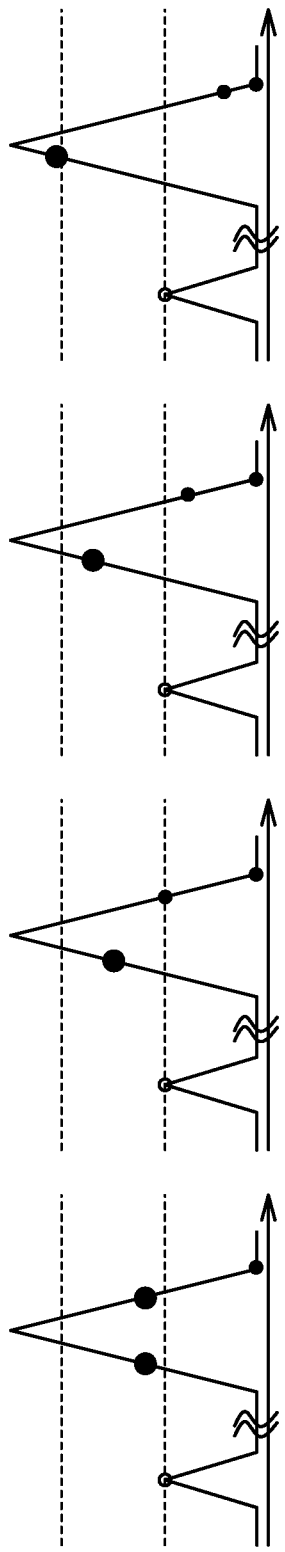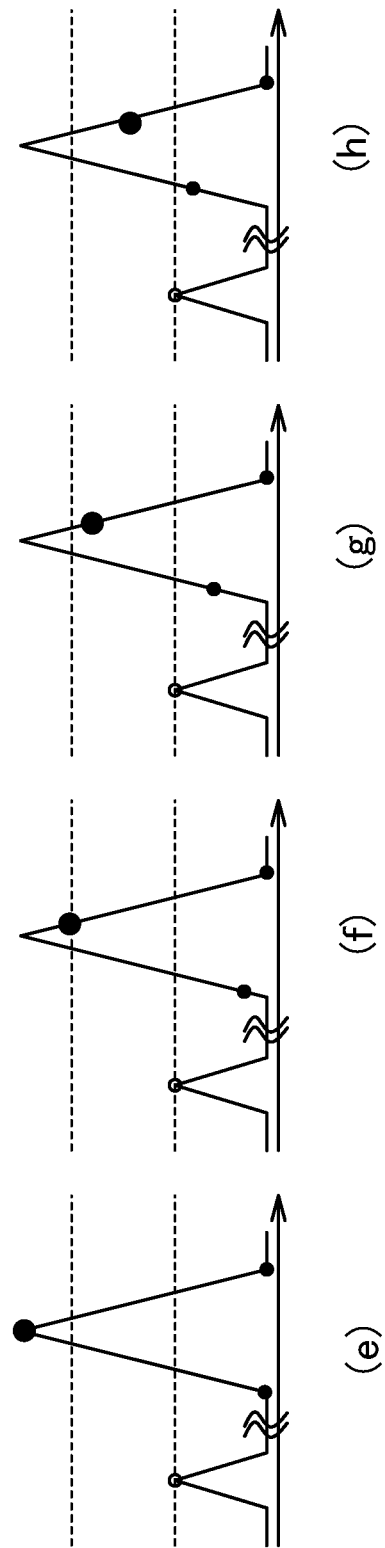

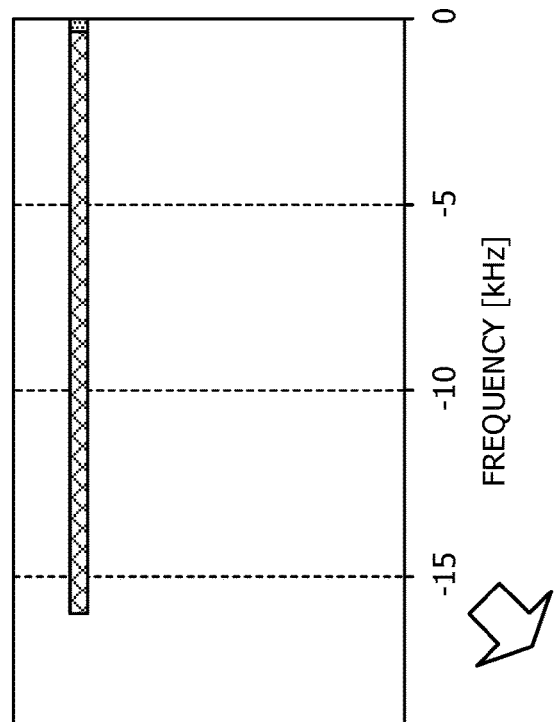
FIG. 27A
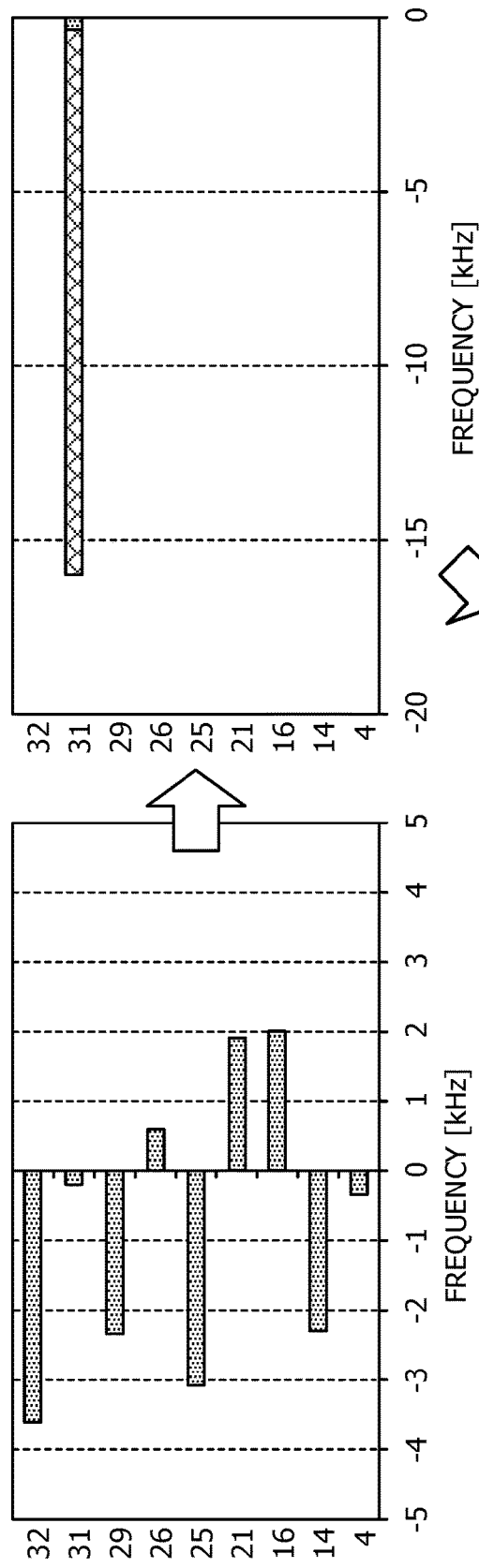
FIG. 27B
FIG. 27C
| SATELLITE NUMBER | FREQUENCY TO BE SEARCHED | | Bin RANGE TO BE SEARCHED (BY 500 Hz) | |
|---|---|---|---|---|
| | MINIMUM VALUE | MAXIMUM VALUE | MINIMUM VALUE | MAXIMUM VALUE |
| 4 | -16.1 | -15.6 | -16.5 | -15.5 |
| 14 | -18.1 | -17.6 | -18.5 | -17.5 |
| 16 | -13.8 | -13.3 | -14 | -13 |
| 21 | -13.9 | -13.4 | -14 | -13 |
| 25 | -18.9 | -18.4 | -19 | -18 |
| 26 | -15.2 | -14.7 | -15.5 | -14.5 |
| 29 | -18.1 | -17.6 | -18.5 | -17.5 |
| 31 | -16 | -15.5 | -16 | -15 |
| 32 | -19.4 | -18.9 | -19.5 | -18.5 |

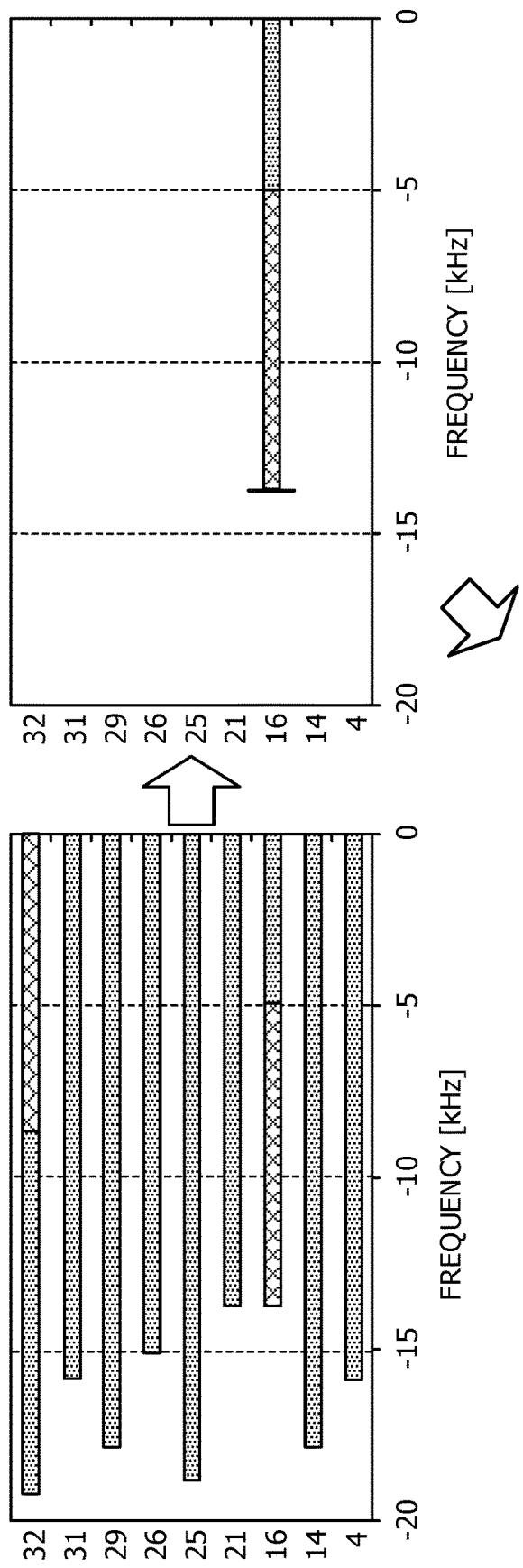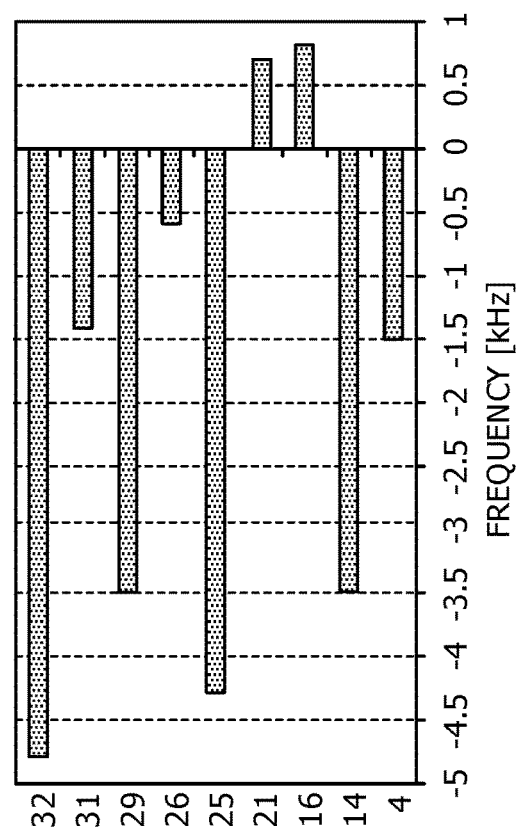

POSITION DETECTION SYSTEM, POSITION DETECTION DEVICE, POSITION DETECTION METHOD, AND SENSOR TERMINAL

CROSS-REFERENCE TO RELATED APPLICATION

This application is based upon and claims the benefit of priority of the prior Japanese Patent Application No. 2018-224165, filed on Nov. 29, 2018, the entire contents of which are incorporated herein by reference.

FIELD

The embodiments discussed herein are related to a position detection system, a position detection device, a position detection method, and a sensor terminal.

BACKGROUND

A Snapshot GPS receiver is disclosed (see "CO-GPS: Energy Efficient GPS Sensing with Cloud Offloading" IEEE Trans. on mobile computing, vol. 15, no. 6, June 2016, pp. 1348-1361). The Snapshot GPS receiver receives satellite signals in a short period of about several tens of msec to 100 msec and generates IQ sample signals. The measuring calculation performed using this IQ sample is performed over the cloud. Required satellite orbit information other than IQ samples is acquired from a calculation device (server) such as NASA via a network.

Examples of a related art include Japanese National Publication of International Patent Application No. 2011-523062, Japanese Laid-open Patent Publication No. 2004-112482, and the like.

SUMMARY

According to an aspect of the embodiments, a position detection system includes a GNSS sensor terminal that receives a satellite signal from a GNSS satellite as a snapshot, at least one relay device that receives the snapshot GNSS signal transmitted by the GNSS sensor terminal, and a calculation device that measures a position of the GNSS sensor terminal by using a code phase and a Doppler frequency of the GNSS satellite obtained from the snapshot GNSS signal, wherein the calculation device estimates an initial position of the GNSS sensor terminal by using position information of the relay device that has received the snapshot GNSS signal transmitted by the GNSS sensor terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a case where the relay device is located at a boundary of integer values;
FIG. 6 is a table illustrating the comparison results of an embodiment and other techniques.

FIGS. 20A to 20H are diagrams illustrating peak searches using eight subsets;

FIGS. 27A to 27C are diagrams for explaining acquisition processing of each satellite;

FIGS. 31A to 31C are diagrams for describing acquisition processing of each satellite;

DESCRIPTION OF EMBODIMENTS

In the Snapshot reception, it is difficult to obtain information on an integer value part in milliseconds as a unit in the signal propagation time from the satellite to the sensor terminal. Without this value, it will be difficult to measure the position of the sensor terminal. Therefore, for example, it is conceivable to roughly narrow down the position using the Doppler frequency of the received signal. However, with this technique, Doppler measuring is not accurate, and erroneous measuring result candidates (Shadow Location) remain.

In view of the above, it is desirable to provide a position detection system, a position detection device, a position detection method, and a sensor terminal that is able to narrow down the initial position of the sensor terminal.

Prior to the description of the embodiments, a position detecting technique using signals from satellites will be described.

For example, a sensor terminal for Global Positioning System (GPS) reception, which is a type of Global Navigation Satellite System (GNSS), consumes a large amount of power, and therefore, a large battery is loaded. In this case, miniaturization and weight reduction of the sensor terminal are hindered. The use of a small battery shortens the operable time of the sensor terminal. In this case, maintenance costs increase due to battery replacement. The power consumption of the sensor terminal for GPS reception is high because the data rate of the satellite signal is as low as 50 bps and the operation time for the sensor terminal to receive the satellite signal is as long as 30 seconds to 12.5 minutes.

To solve this problem, a technique called "Snapshot reception" has been developed. In this technology, the sensor terminal is operated for a short time of about several tens of msec, and the measuring calculation is performed using the code phase and the Doppler frequency obtained during this time. A method has been proposed in which ephemeris (satellite orbit data) and the like required for measuring calculation are obtained from the net, and measuring calculation is also performed over the cloud.

Figure 1:
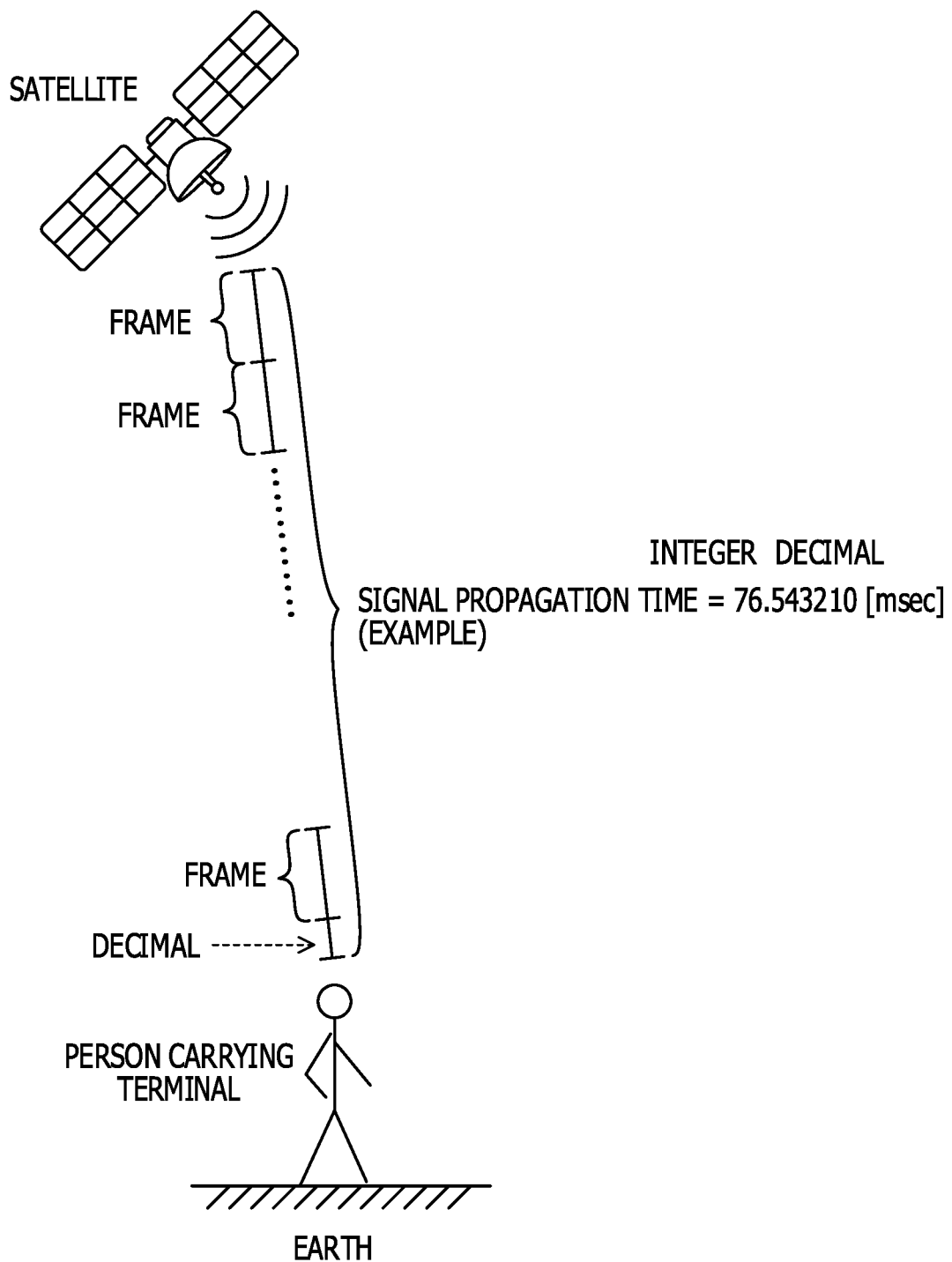
FIG. 1 is a diagram illustrating Snapshot reception.
Figure 2:
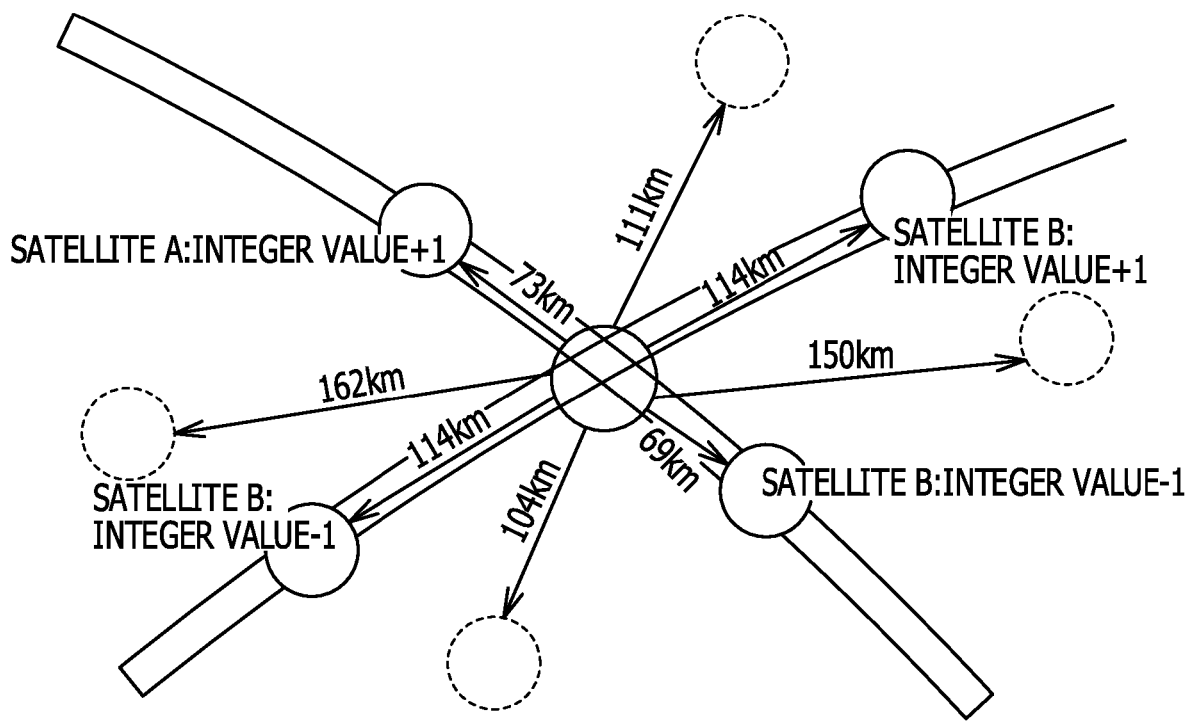
FIG. 2 is a diagram illustrating Shadow Location.

However, as illustrated in FIG. 1, in the Snapshot reception, it is difficult to obtain information on the integer value part in milliseconds as a unit in the signal propagation time from the satellite to the sensor terminal. If this integer value may not be obtained, it is difficult to perform a measuring calculation of the sensor terminal. Therefore, it is conceivable to roughly narrow down the position using the Doppler frequency of the received signal. However, since the measuring accuracy using the Doppler frequency is low, as illustrated in 2, an erroneous measuring result candidate (Shadow Location) remains. For example, even if the integer value changes by +1, measuring result candidates differ by 100 km or more will remain. In FIG. 2, the central "o" is the correct position, and the other "o" is the Shadow Location.

Therefore, in the following embodiments, a position detection system, a position detection device, a position detection method, and a sensor terminal which may narrow down the initial position of the sensor terminal will be described.

First Embodiment

Figure 3A:
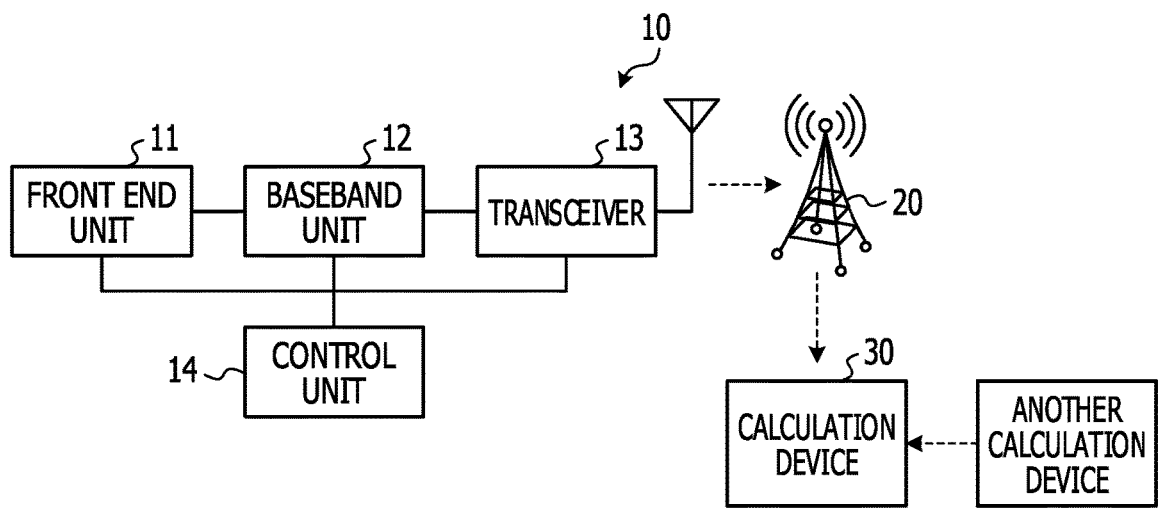
FIG. 3A is a block diagram illustrating the position detection system according to a first embodiment.

FIG. 3A is a block diagram illustrating a position detection system 100 according to a first embodiment. As illustrated in FIG. 3A, the position detection system 100 includes a sensor terminal 10, a relay device 20, a calculation device 30, and the like. The sensor terminal 10 is a GNSS sensor terminal including a front end unit 11, a baseband unit 12, a transceiver 13, a control unit 14, and the like.

Figure 3B:
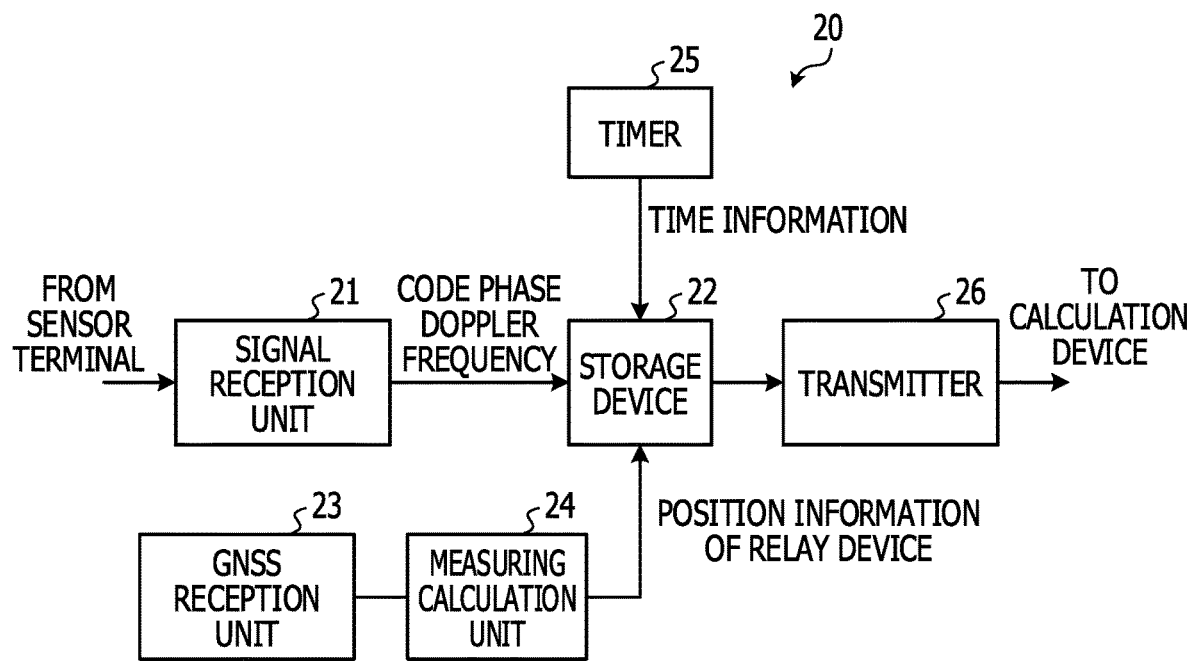
FIG. 3B is a block diagram illustrating a relay device according to the first embodiment.

FIG. 3B is a block diagram illustrating the relay device 20. The relay device 20 is a base station, an access point, or a gateway of a low power wide area (LPWA). As illustrated in FIG. 3B, the relay device 20 includes a signal reception unit 21, a storage device 22, a GNSS reception unit 23, a measuring calculation unit 24, a timer 25, a transmitter 26, and the like. A plurality of relay devices 20 are provided. Each relay device 20 is disposed at a different place.

The sensor terminal 10 transmits and receives signals wirelessly. The relay device 20 adds information such as its own position information to the snapshot GNSS signal received from the sensor terminal 10, and transmits the information to the calculation device 30. The relay device 20 may transmit signals wirelessly, may transmit signals by a wire, or may transmit signals in a both wireless and wired manner. The calculation device 30 uses the signal received from the relay device 20 to calculate the initial position of the sensor terminal 10. Details will be described below.

Figure 4A:
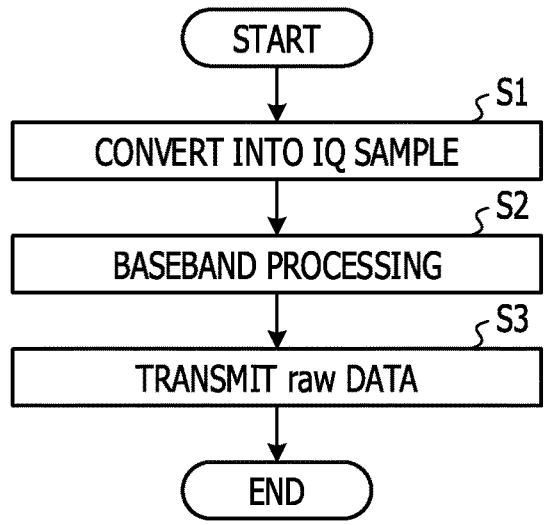
FIG. 4A is a flowchart representing an operation of a sensor terminal.

FIG. 4A is a flowchart representing an operation of the sensor terminal 10. First, the front end unit 11 has a function as an analog front end, receives a GNSS satellite signal from a GNSS satellite as a snapshot, and converts the received GNSS satellite signal into a digital IQ sample (step S1). The IQ sample is a signal obtained by down-converting a GNSS satellite signal from a radio frequency (RF) frequency band to an intermediate frequency (IF) frequency band, passing through a band limiting filter, and then performing analog-to-digital conversion. It is called an IQ sample because it is down-converted with two quadrature phases of I and Q.

The baseband unit 12 calculates raw data from the IQ samples received from the front end unit 11 by baseband processing, and outputs the calculated raw data (step S2). The raw data is code phase and Doppler frequency obtained by performing baseband processing (satellite acquisition processing) on IQ samples obtained from GNSS satellite signals. These two types of values are calculated by the number of GNSS satellites. The code phase represents a fraction of the signal propagation delay from the GNSS satellite to the sensor terminal 10 in the unit of 1 msec. The transceiver 13 wirelessly transmits the raw data output from the baseband unit 12 as a snapshot GNSS signal (step S3).

Figure 4B:
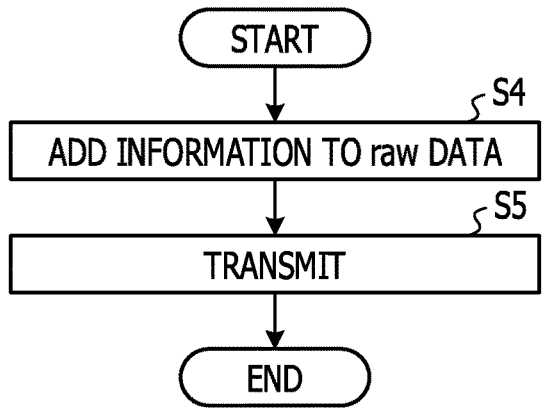
FIG. 4B is a flowchart representing an operation of the relay device.

FIG. 4B is a flowchart representing the operation of the relay device 20. The signal reception unit 21 receives the raw data transmitted from the sensor terminal 10. The signal reception unit 21 extracts the code phase and the Doppler frequency included in the raw data, and causes the storage device 22 to store the code phase and the Doppler frequency. The GNSS reception unit 23 receives GNSS satellite signals from GNSS satellites. In this case, the GNSS reception unit 23 does not perform snapshot reception, but receives both the integer value and the decimal value of the signal propagation time. The measuring calculation unit 24 uses the GNSS satellite signal received by the GNSS reception unit 23 to calculate the position of the relay device 20 and causes the storage device 22 to store the position. The timer 25 causes the storage device 22 to store time information (such as current time). The storage device 22 stores the code phase and the Doppler frequency received from the signal reception unit 21 and the position of the relay device 20 received from the measuring calculation unit 24 in association with the time information received from the timer 25 (step S4). For example, the storage device 22 adds the position information of the relay device 20 and the time information to the raw data. The transmitter 26 transmits the information stored in the storage device 22 (step S5).

Figure 4C:
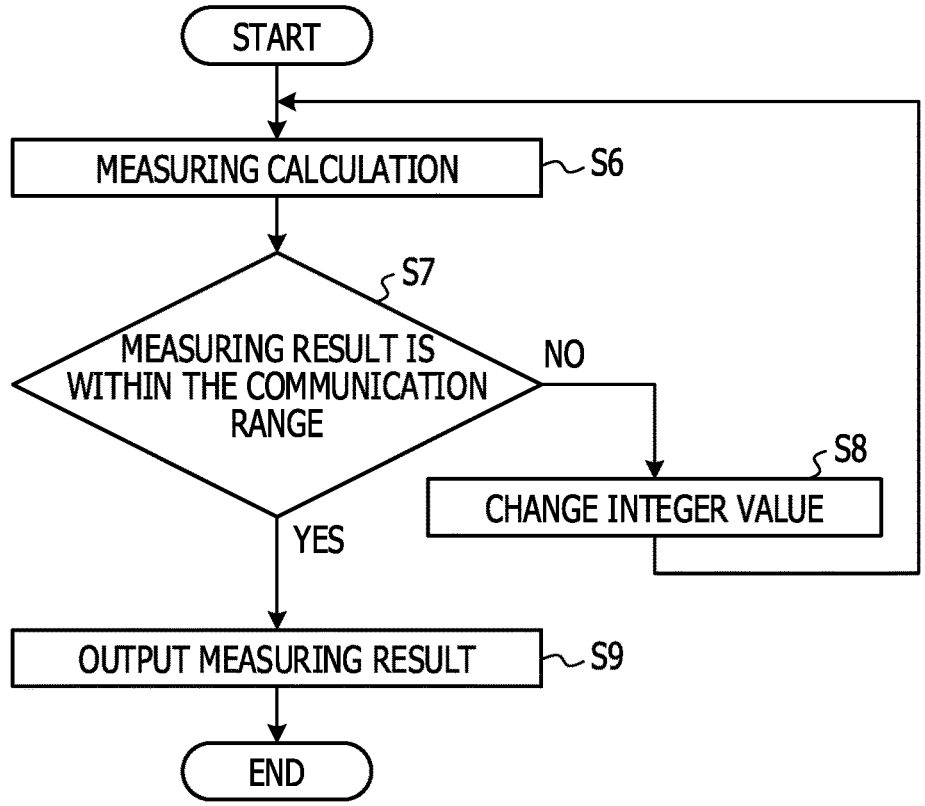
FIG. 4C is a flowchart representing an operation of the calculation device.

FIG. 4C is a flowchart representing the operation of the calculation device 30. The calculation device 30 acquires satellite orbit information from another the calculation device (server) over the net such as NASA, and performs measuring calculation together with the information transmitted from the relay device 20 (step S6). In this measuring calculation, the calculation device 30 calculates the position of the sensor terminal 10 using the code phase and the Doppler frequency. In this case, as illustrated in FIG. 2, the Shadow Location remains. However, in the present embodiment, the calculation device 30 is able to narrow down the integer value of the GNSS signal to a correct value by using the position information of the relay device 20 that has received the snapshot GNSS signal from the sensor terminal 10 among the measuring result candidates. For example, when the communication distance is about several kilometers as in LPWA, it is possible to exclude combinations of integer values that generate Shadow Location by acquiring which relay device 20 has received a signal from the sensor terminal 10. Accordingly, the calculation device 30 is able to estimate the initial position of the sensor terminal 10.

The relay device 20 that receives a snapshot GNSS signal from the sensor terminal 10 may be located at the boundary of integer values. For example, as illustrated in FIG. 5, the relay device 20 may be located at a position where the satellite signal propagation time in the relay device 20 is within a boundary between an integer value of 71 msec and an integer value of 72 msec, such as 72.000000 msec. In this case, even if the sensor terminal 10 is located in the area of the integer value 71 msec, if 72 msec is used as the integer value in the measuring calculation, an erroneous measuring result may be output.

Therefore, after the execution of step S6, the calculation device 30 determines whether the measuring result is located within the communication range of the relay device 20 (step S7). By executing step S7, it is possible to determine whether the measuring result is an error. When it is determined as "No" in step S7, the calculation device 30 changes the integer value of the satellite whose propagation time in the relay device 20 is very close to the integer value (step S8). The integer value may be determined by determining how close (for example, whether 71.99 msec<propagation time<72.01 msec is satisfied) the propagation time in the relay device 20 is to the nearest integer value using a threshold. After execution of step S8, step S6 is executed again using the determined integer value. If it is determined "Yes" in step S7, the calculation device 30 outputs the measuring result (step S9).

According to the present embodiment, since the time for the sensor terminal 10 to receive the GNSS satellite signal is as short as several tens of msec, the power consumption of the sensor terminal 10 may be suppressed. The integer value of the signal propagation time may be narrowed down to the correct value using the position information of the relay device 20 that has received the snapshot GNSS signal from the sensor terminal 10. Therefore, the initial position of the sensor terminal 10 may be narrowed down. For example, by checking whether the measuring calculation result is within the communication range of the relay device 20, the initial position of the sensor terminal 10 may be narrowed down with higher accuracy.

FIG. 6 is a table illustrating the comparison result of the present embodiment and other techniques. In FIG. 6, "single measuring" is a case where GPS reception is performed by the sensor terminal alone. In the "single measuring", the terminal alone calculates the measuring. All integer values of the signal propagation time may be received. Fractional values of signal propagation time may be processed in the baseband unit. However, power consumption increases because it takes more than 30 seconds to receive. For example, power consumption in the front end unit and the digital processing unit is increased.

In FIG. 6, "snapshot measuring" is a technique using snapshot reception, and does not use position information of a relay device. In "snapshot measuring", measuring is calculated in the cloud or the like. The integer value of the signal propagation time may not be obtained. Although the power consumption is reduced compared to "single measuring", the Doppler frequency, the ground surface height, and the like are used, so that Shadow Location remains in the measuring result. For example, it is difficult to narrow down the initial position of the sensor terminal 10 with high accuracy.

On the other hand, according to the present embodiment, it is possible to suppress the occurrence of Shadow Location while suppressing the power consumption. For example, the initial position may be narrowed down while suppressing the power consumption.

As the position information of the relay device 20, the installation position information of the specified relay device 20 may be used. For example, the service area of the sensor terminal 10 may be used. The service area is an area where the installation position of the relay device 20 is designated and the sensor terminal 10 is used. The position range of the sensor terminal 10 may be narrowed by using the specified installation position information of the relay device 20.

Modification Example 1-1

Figure 7A:
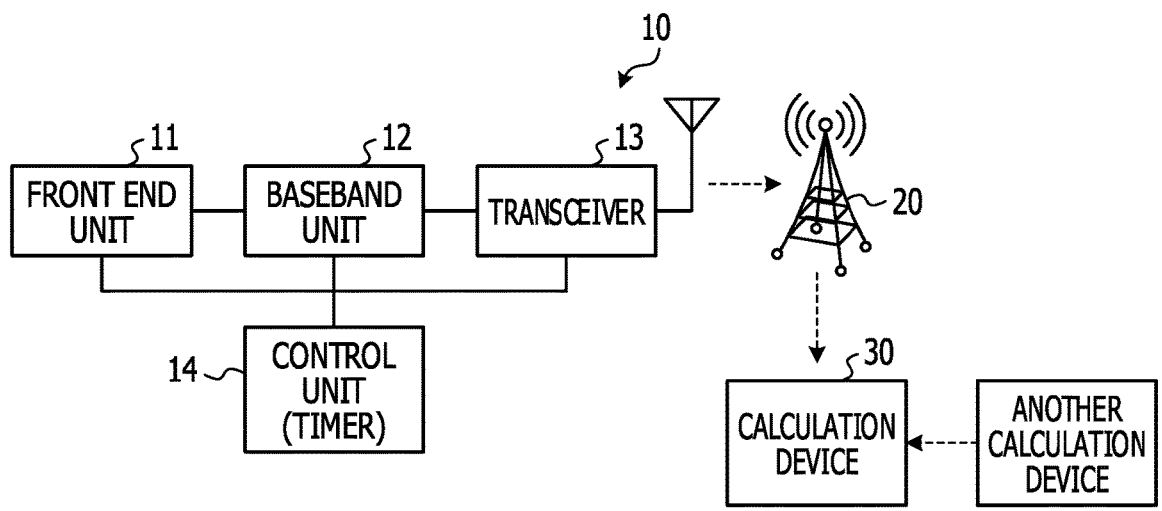
FIG. 7A is a block diagram illustrating a position detection system according to Modification Example 1-1.
Figure 7B:
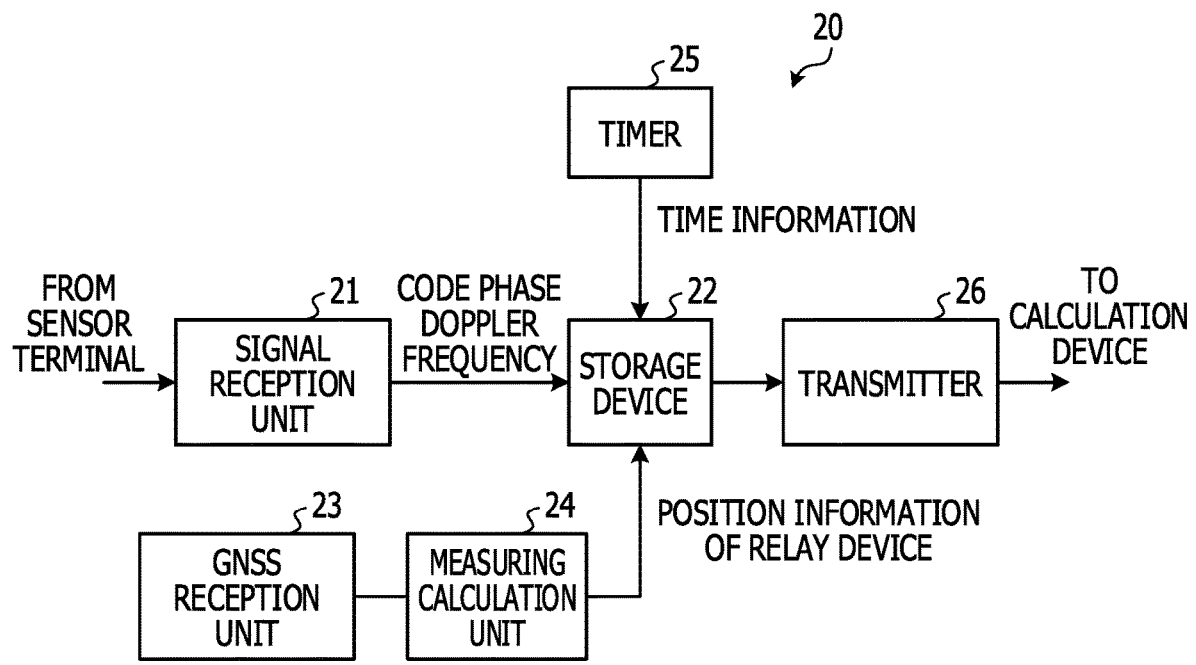
FIG. 7B is a block diagram illustrating a relay device according to Modification Example 1-1.

FIG. 7A is a block diagram illustrating a position detection system 100a according to Modification Example 1-1. As illustrated in FIG. 7A, the position detection system 100a differs from the position detection system 100 in FIG. 3A in that the control unit 14 of the sensor terminal 10 also functions as a timer. As illustrated in FIG. 7B, the relay device 20 and the calculation device 30 may have the same configuration as FIG. 3B.

Figure 8A:
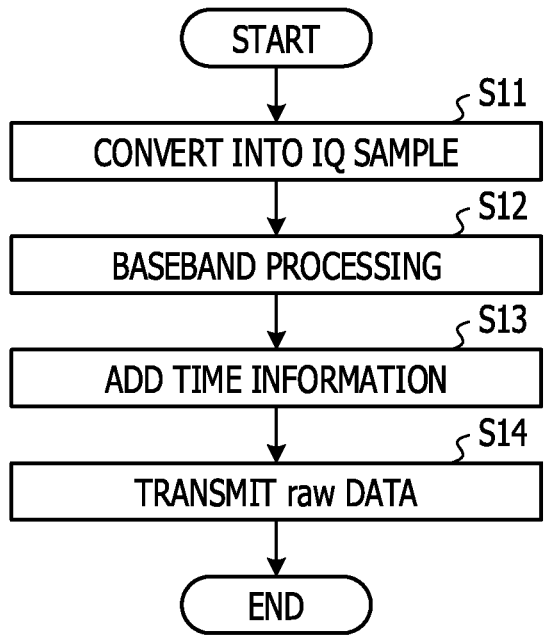
FIG. 8A is a flowchart representing an operation of a sensor terminal.

FIG. 8A is a flowchart representing an operation of a sensor terminal 10a. The front end unit 11 receives the GNSS satellite signal from the GNSS satellite as a snapshot, and converts the received GNSS satellite signal into a digital IQ sample (step S11). The baseband unit 12 calculates raw data from the IQ samples received from the front end unit 11 by baseband processing, and outputs the calculated raw data (step S12). The control unit 14 adds, to the raw data, time information when the GNSS satellite signal is received as a snapshot (step S13). The transceiver 13 wirelessly transmits the raw data to which the time information is added as a snapshot GNSS signal (step S14).

Figure 8B:
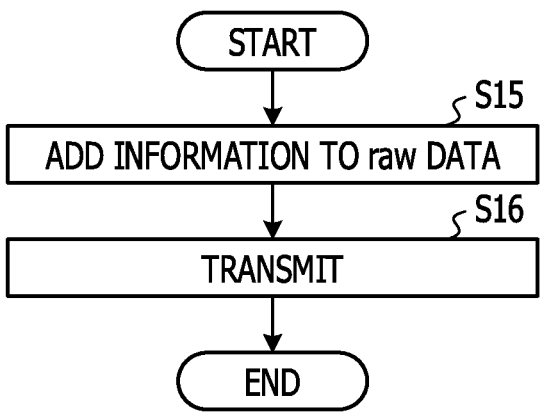
FIG. 8B is a flowchart representing an operation of the relay device.

FIG. 8B is a flowchart representing the operation of the relay device 20. The signal reception unit 21 receives raw data to which time information is added. The signal reception unit 21 extracts the code phase and the Doppler frequency included in the raw data, and causes the storage device 22 to store the code phase and the Doppler frequency in together with time information. The GNSS reception unit 23 receives GNSS satellite signals from GNSS satellites. In this case, the GNSS reception unit 23 does not perform snapshot reception, but receives both the integer value and the decimal value of the signal propagation time. The measuring calculation unit 24 uses the GNSS satellite signal received by the GNSS reception unit 23 to calculate the position of the relay device 20 and causes the storage device 22 to store the position. The storage device 22 stores the position of the relay device 20 received from the measuring calculation unit 24 in association with the code phase and the Doppler frequency to which the time information is added (step S15). For example, the storage device 22 adds the position of the relay device 20 to the raw data to which the time information is added. The transmitter 26 transmits the information stored in the storage device 22 (step S16).

Figure 8C:
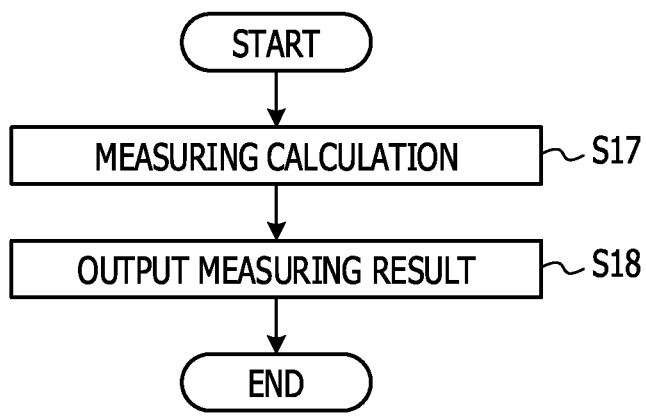
FIG. 8C is a flowchart representing an operation of the calculation device.

FIG. 8C is a flowchart representing an operation of the calculation device 30. The calculation device 30 acquires satellite orbit information from another calculation device (server) over the net such as NASA, and performs measuring calculation together with the information transmitted from the relay device 20 (step S17). The measuring calculation is the same calculation as steps S6 to S8 in FIG. 4C. The calculation device 30 outputs the measuring calculation result (step S18).

According to the present modification example, time information is added not at the relay device 20 but at the sensor terminal 10. According to this configuration, it is possible to add time information with high accuracy when there is a delay between the reception of the satellite signal by the sensor terminal 10 and the reception of the raw data by the relay device 20.

Modification Example 1-2

Figure 9A:
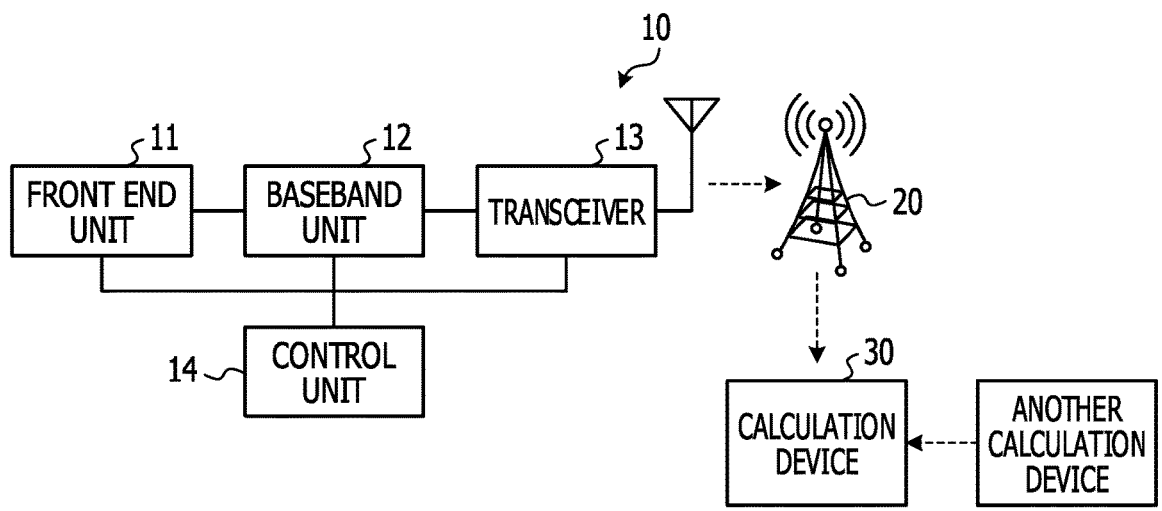
FIG. 9A is a block diagram illustrating a position detection system according to Modification Example 1-2.
Figure 9B:
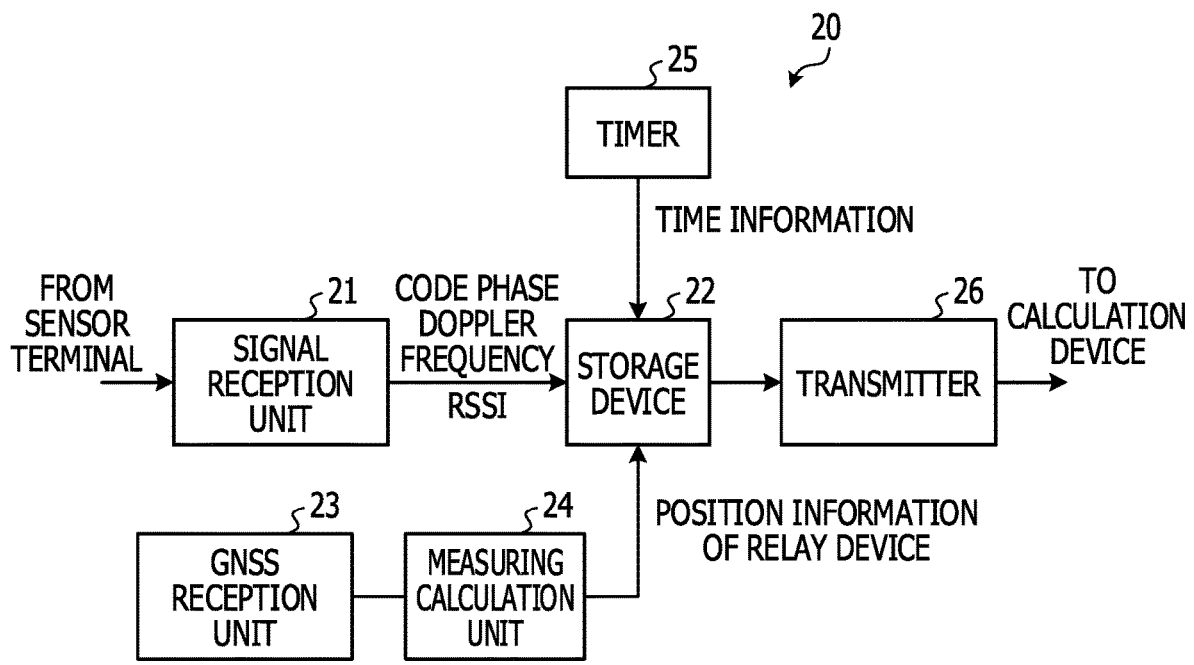
FIG. 9B is a block diagram illustrating a relay device according to Modification Example 1-2.

A position detection system 100b according to Modification Example 1-2 uses a received signal strength indicator (RSSI) at the time of the measuring calculation by the calculation device 30. The system configuration is the same as that of FIGS. 3A and 3B, as exemplified in FIGS. 9A and 9B. In the present modification example, as illustrated in FIG. 9B, the signal reception unit 21 outputs the RSSI.

Figure 10A:
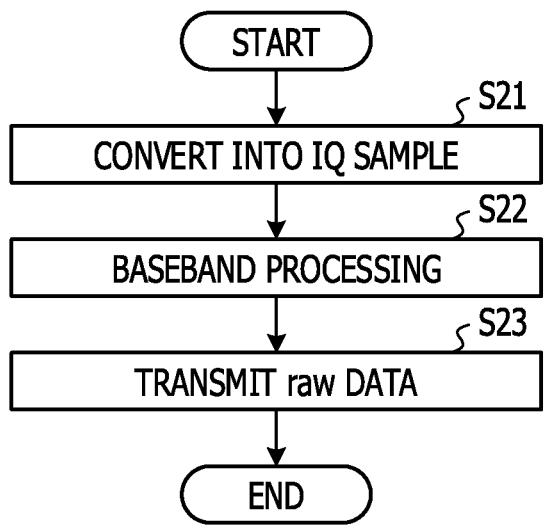
FIG. 10A is a flowchart representing an operation of the sensor terminal.

FIG. 10A is a flowchart representing an operation of the sensor terminal 10. The front end unit 11 receives the GNSS satellite signal from the GNSS satellite as a snapshot, and converts the received GNSS satellite signal into a digital IQ sample (step S21). The baseband unit 12 calculates raw data from the IQ samples received from the front end unit 11 by baseband processing, and outputs the calculated raw data (step S22). The transceiver 13 wirelessly transmits the raw data as a snapshot GNSS signal (step S23).

Figure 10B:
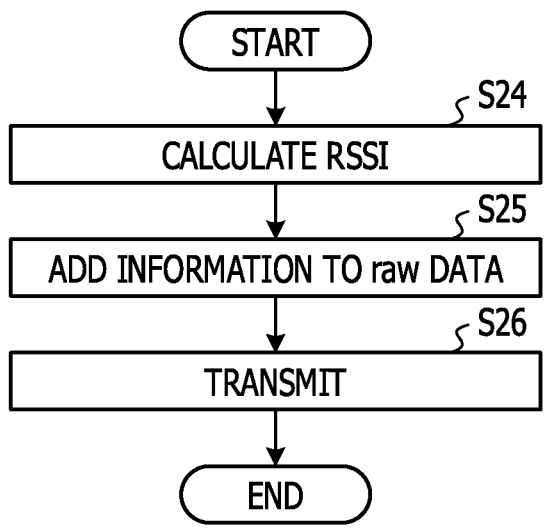
FIG. 10B is a flowchart representing an operation of the relay device.

FIG. 10B is a flowchart representing an operation of the relay device 20. The signal reception unit 21 receives the raw data transmitted from the sensor terminal 10. The signal reception unit 21 calculates RSSI (step S24). The signal reception unit 21 extracts the code phase and the Doppler frequency included in the raw data, associates the code phase and the Doppler frequency with the RSSI, and causes the storage device 22 to store the code phase and the Doppler frequency. The GNSS reception unit 23 receives GNSS satellite signals from GNSS satellites. In this case, the GNSS reception unit 23 does not perform snapshot reception, but receives both the integer value and the decimal value of the signal propagation time. The measuring calculation unit 24 uses the GNSS satellite signal received by the GNSS reception unit 23 to calculate the position of the relay device 20 and causes the storage device 22 to store the position. The timer 25 causes the storage device 22 to store time information. The storage device 22 stores the RSSI, the code phase and the Doppler frequency received from the signal reception unit 21 and the position of the relay device 20 received from the measuring calculation unit 24 in association with the time information received from the timer 25 (step S25). For example, the storage device 22 adds the RSSI, the position of the relay device 20, and time information to the raw data. The transmitter 26 transmits the information stored in the storage device 22 (step S26).

Figure 10C:
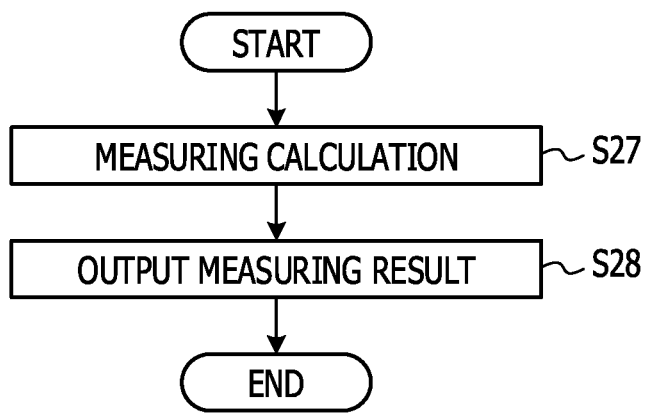
FIG. 10C is a flowchart representing an operation of the calculation device.

FIG. 10C is a flowchart representing an operation of the calculation device 30. The calculation device 30 acquires satellite orbit information from another calculation device (server) over the net such as NASA, and performs measuring calculation together with the information transmitted from relay device 20 (step S27). The measuring calculation is the same calculation as steps S6 to S8 in FIG. 4C. However, by performing three-point measuring using the RSSI of three or more relay devices 20, the position of the sensor terminal 10 is narrowed. The calculation device 30 outputs the measuring calculation result (step S28).

Figure 11:
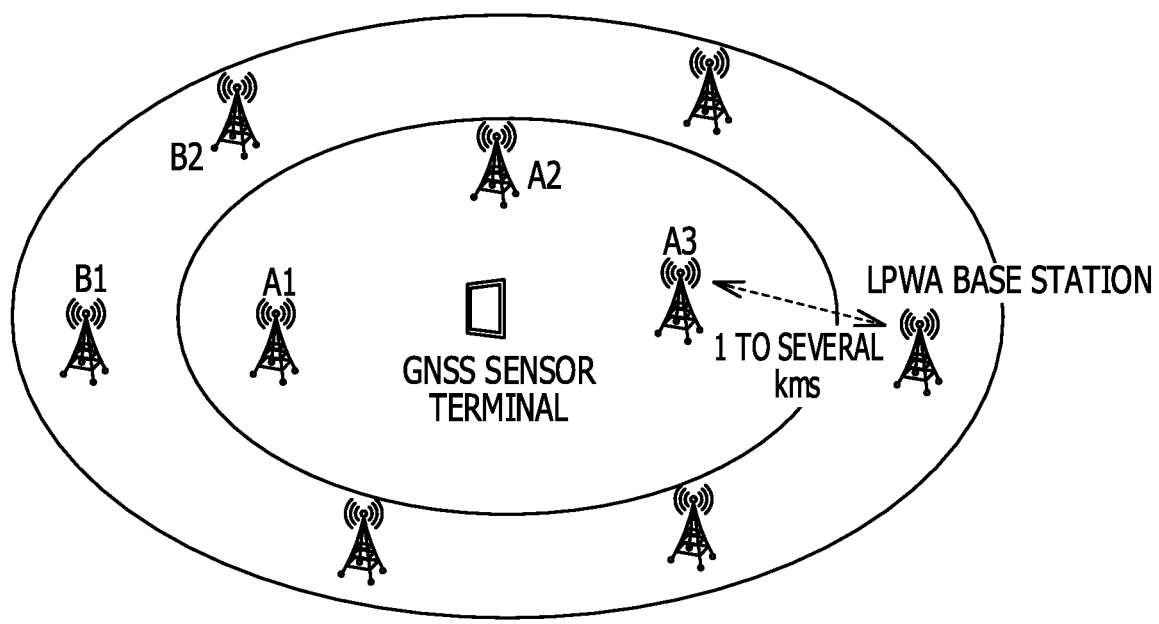
FIG. 11 is a diagram illustrating three-point measuring using RSSI.

According to the present modification example, the position of the sensor terminal 10 may be narrowed down with higher accuracy by acquiring the RSSIs from three or more relay devices 20. For example, as illustrated in FIG. 11, the position of the sensor terminal 10 may be narrowed down with higher accuracy by three-point measuring using the RSSI obtained from relay devices A1 to A3. As a result, the integer value of the signal propagation time may be narrowed to the correct value with higher accuracy. Therefore, the initial position of the sensor terminal 10 may be narrowed down with higher accuracy.

The technique using the RSSI as in the present modification example may be applied to Modification Example 1-1.

Modification Example 1-3

Figure 12A:
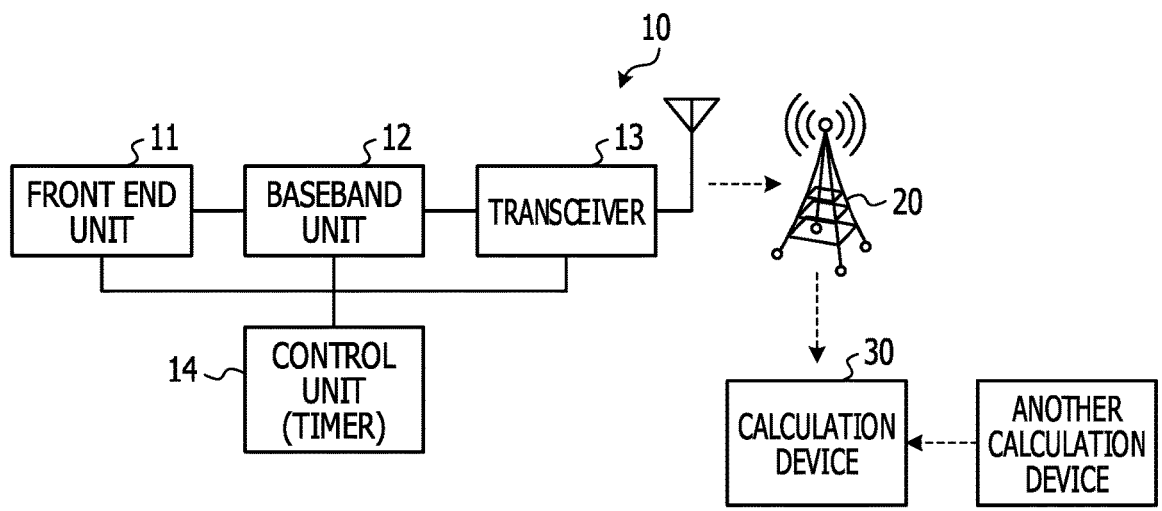
FIG. 12A is a block diagram illustrating a position detection system according to Modification Example 1-3.
Figure 12B:
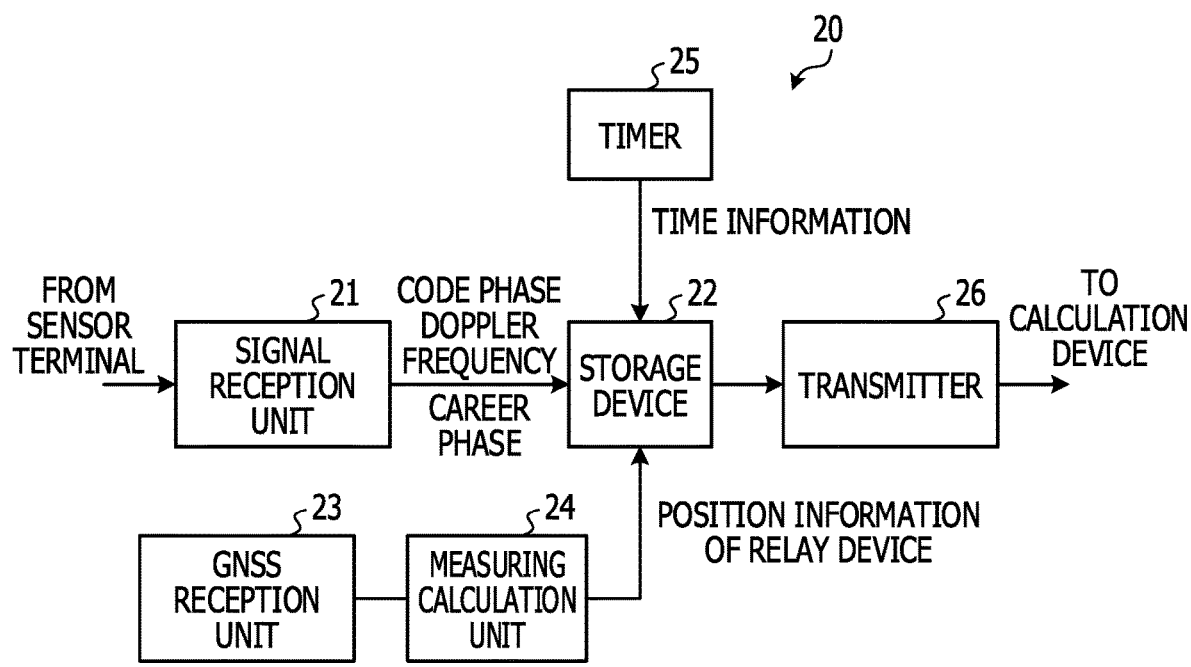
FIG. 12B is a block diagram illustrating a relay device according to Modification Example 1-3.

A position detection system 100c according to Modification Example 1-3 performs real time kinematic (RTK)

measuring using a carrier phase. The system configuration is the same as that of FIGS. 7A and 7B, as exemplified in FIGS. 12A and 12B. In the present modification example, the transceiver 13 of the sensor terminal 10a further transmits the carrier phase of each satellite, and the signal reception unit 21 of the relay device 20 receives the code phase, Doppler frequency, time information, and carrier phase from the reference station.

Figure 13A:
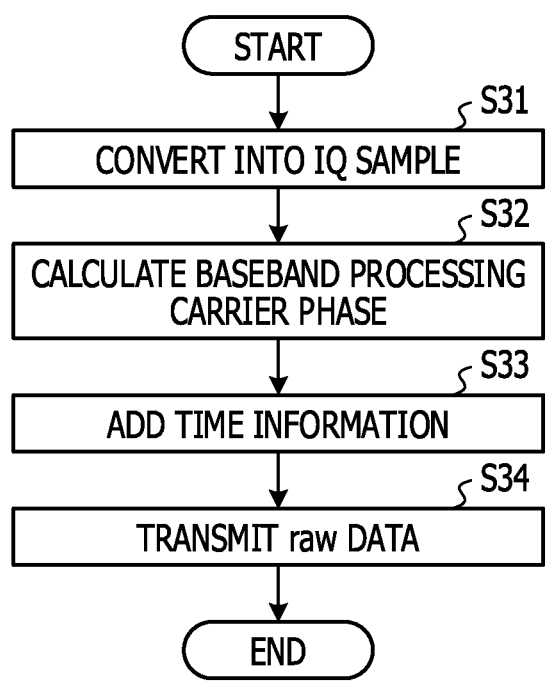
FIG. 13A is a flowchart representing an operation of the sensor terminal.

FIG. 13A is a flowchart representing an operation of the sensor terminal 10a. The front end unit 11 receives the GNSS satellite signal from the GNSS satellite as a snapshot, and converts the received GNSS satellite signal into a digital IQ sample (step S31). The baseband unit 12 calculates the raw data from the IQ samples received from the front end unit 11 by baseband processing, and outputs the calculated raw data. The baseband unit 12 calculates the carrier phase from the IQ sample and outputs the calculated carrier phase (step S32). The control unit 14 adds time information to the raw data and the carrier phase (step S33). The transceiver 13 wirelessly transmits the raw data and the carrier phase to which the time information is added as a snapshot GNSS signal (step S34).

Figure 13B:
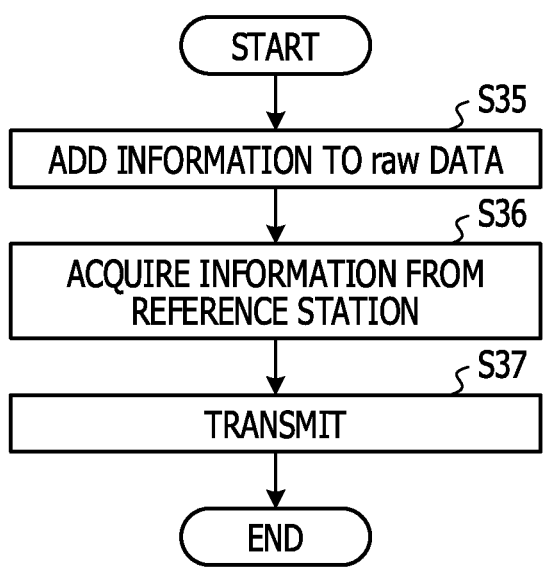
FIG. 13B is a flowchart representing an operation of the relay device.

FIG. 13B is a flowchart representing an operation of the relay device 20. The signal reception unit 21 receives the raw data and the carrier phase transmitted from the sensor terminal 10. The signal reception unit 21 causes the storage device 22 to store the carrier phase and the code phase and the Doppler frequency included in the raw data. The GNSS reception unit 23 receives GNSS satellite signals from GNSS satellites. In this case, the GNSS reception unit 23 does not perform snapshot reception, but receives both the integer value and the decimal value of the signal propagation time. The measuring calculation unit 24 uses the GNSS satellite signal received by the GNSS reception unit 23 to calculate the position of the relay device 20 and causes the storage device 22 to store the position. The storage device 22 stores the raw data and the carrier phase to which the time information is added in association with the position of the relay device 20 received from the measuring calculation unit 24 (step S35).

The signal reception unit 21 receives raw data, time information, and carrier phase from a reference station. The storage device 22 stores these pieces of information (step S36). The transmitter 26 transmits the information stored in the storage device 22 (step S37).

Figure 13C:
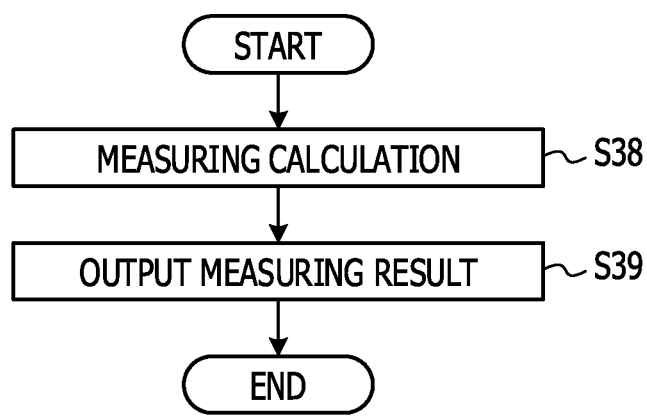
FIG. 13C is a flowchart representing an operation of the calculation device.

FIG. 13C is a flowchart representing an operation of the calculation device 30. The calculation device 30 acquires satellite orbit information from another calculation device (server) over the net such as NASA, and performs measuring calculation together with information transmitted from the relay device 20 using a method of RTK measuring (step S38). Also in this case, the calculation device 30 narrows down the integer value of the GNSS signal to a correct value by using the position information of the relay device 20 that has received the snapshot GNSS signal from the sensor terminal 10. The calculation device 30 outputs the measuring calculation result (step S39).

According to the present embodiment, RTK measuring may be performed. Thereby, the position of the sensor terminal 10 may be calculated with high accuracy. The technique using RTK measuring as in the present modification example may also be applied to Modification Example 1-1 or Modification Example 1-2.

Modification Example 1-4

Figure 14A:
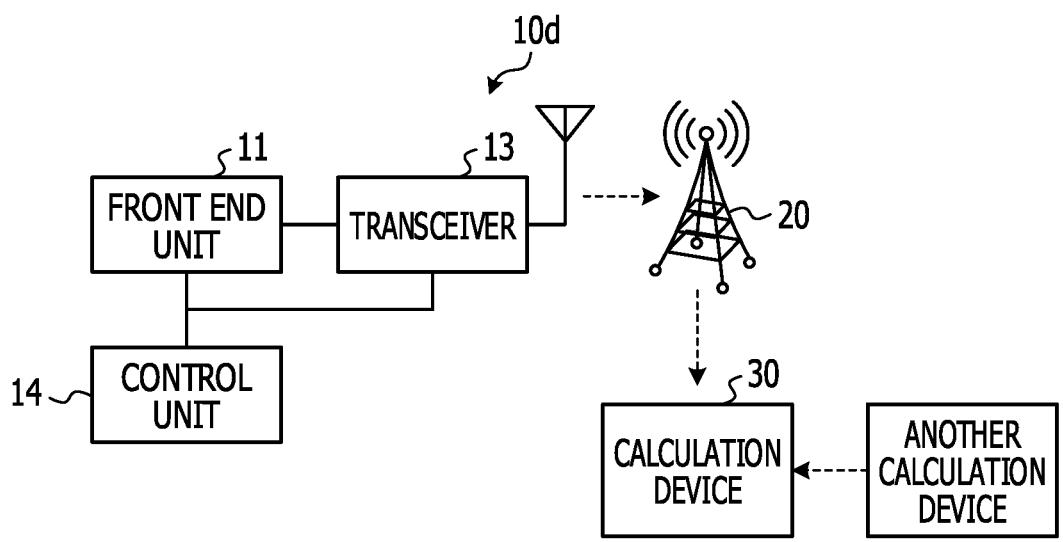
FIG. 14A is a block diagram illustrating a position detection system according to Modification Example 1-4.
Figure 14B:
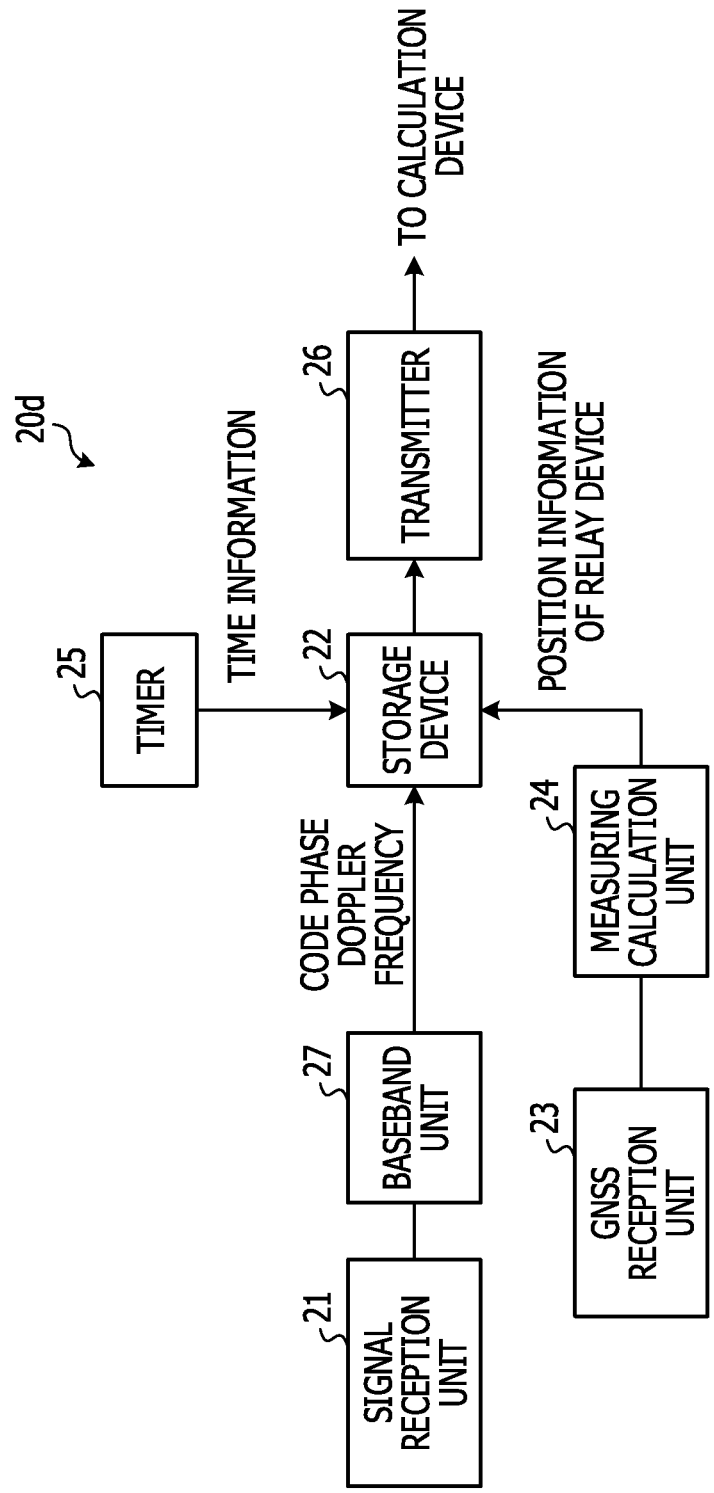
FIG. 14B is a block diagram illustrating a relay device according to Modification Example 1-4.

In a position detection system 100d according to Modification Example 1-4, baseband processing is performed by the relay device. FIG. 14A is a block diagram illustrating the position detection system 100d. As illustrated in FIG. 14A, the position detection system 100d differs from the position detection system 100 in FIG. 3A in that a sensor terminal 10d is provided instead of the sensor terminal 10, and a relay device 20d is provided instead of the relay device 20. The sensor terminal 10d differs from the sensor terminal 10 of FIG. 3A in that the baseband unit 12 is not provided. The relay device 20d differs from the relay device 20 of FIG. 3B in that a baseband unit 27 is provided.

Figure 15A:
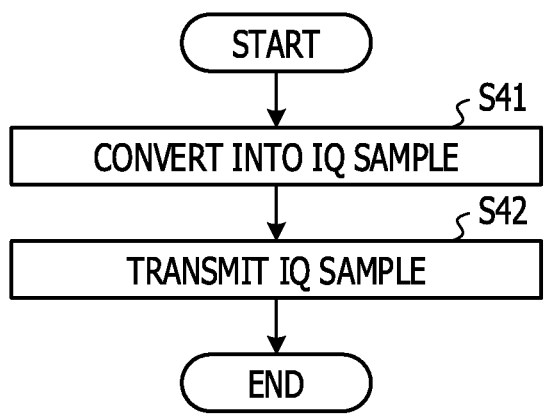
FIG. 15A is a flowchart representing an operation of the sensor terminal.

FIG. 15A is a flowchart representing an operation of the sensor terminal 10d. The front end unit 11 receives the GNSS satellite signal from the GNSS satellite as a snapshot, and converts the received GNSS satellite signal into a digital IQ sample (step S41). The transceiver 13 wirelessly transmits the IQ sample as a snapshot GNSS signal (step S42).

Figure 15B:
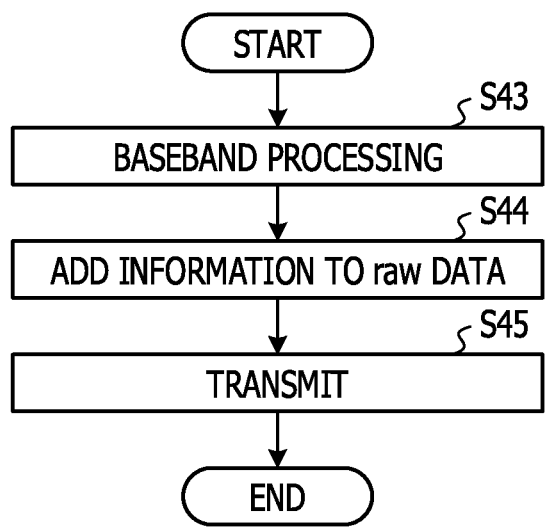
FIG. 15B is a flowchart representing an operation of the relay device.

FIG. 15B is a flowchart representing an operation of the relay device 20d. The signal reception unit 21 receives the IQ samples. The baseband unit 27 calculates raw data from the IQ samples received from the signal reception unit 21 by baseband processing, and causes the storage device 22 to store the code phase and the Doppler frequency included in the raw data (step S43).

The GNSS reception unit 23 receives GNSS satellite signals from GNSS satellites. In this case, the GNSS reception unit 23 receives both the integer part and the decimal part of the signal propagation time instead of performing snapshot reception. The measuring calculation unit 24 uses the GNSS satellite signal received by the GNSS reception unit 23 to calculate the position of the relay device 20 and causes the storage device 22 to store the position. The timer 25 causes the storage device 22 to store time information. The storage device 22 stores the position of the relay device 20 received from the measuring calculation unit 24 in association with the code phase and the Doppler frequency to which the time information is added (step S44). For example, the storage device 22 adds the position of the relay device 20 to the raw data to which the time information is added. The transmitter 26 transmits the information stored in the storage device 22 (step S45).

Figure 15C:
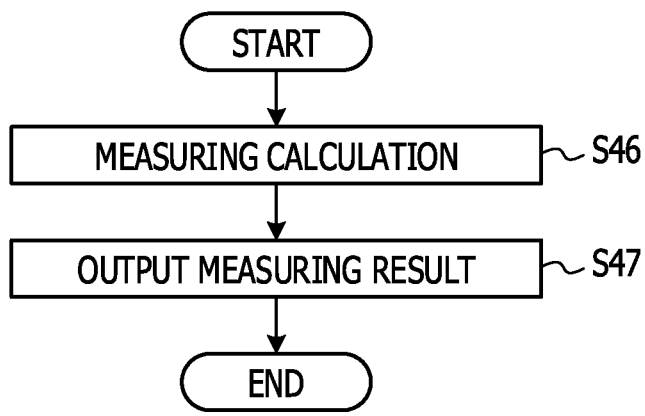
FIG. 15C is a flowchart representing an operation of the calculation device.

FIG. 15C is a flowchart representing an operation of the calculation device 30. The calculation device 30 acquires satellite orbit information from another calculation device (server) over the net such as NASA, and performs measuring calculation together with the information transmitted from relay device 20 (step S46). The measuring calculation is the same calculation as steps S6 to S8 in FIG. 4C. The calculation device 30 outputs the measuring calculation result (step S47).

The technique of providing the baseband unit in the relay device 20 as in the present modification example may also be applied to Modification Examples 1-1 to 1-3.

Modification Example 1-5

Figure 16A:
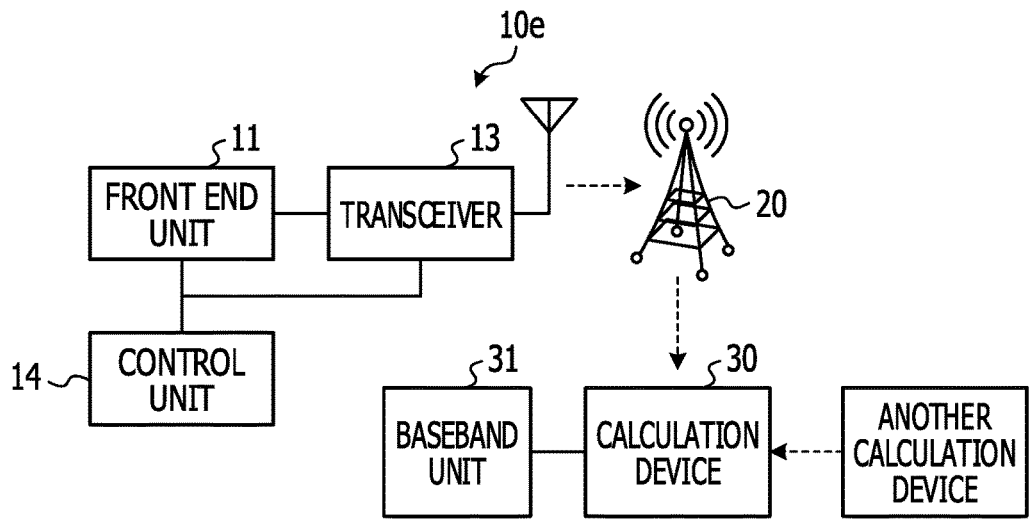
FIG. 16A is a block diagram illustrating a position detection system according to Modification Example 1-5.
Figure 16B:
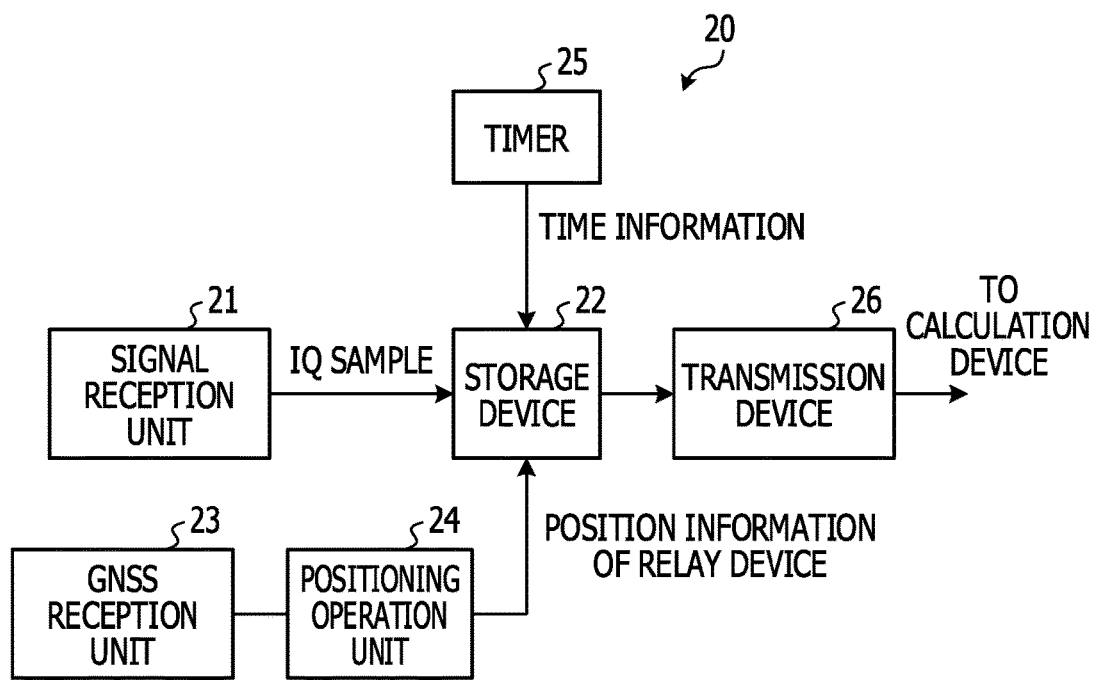
FIG. 16B is a block diagram illustrating a relay device according to Modification Example 1-5.

In a position detection system 100e according to Modification Example 1-5, baseband processing is performed by the relay device. FIG. 16A is a block diagram illustrating the position detection system 100e. As illustrated in FIG. 16A, the position detection system 100e is different from the position detection system 100 of FIG. 3A in that a sensor terminal 10e is provided instead of the sensor terminal 10, and the calculation device 30 is provided with a baseband unit 31. The sensor terminal 10e is different from the sensor terminal 10 of FIG. 3A in that the baseband unit 12 is not provided.

Figure 17A:
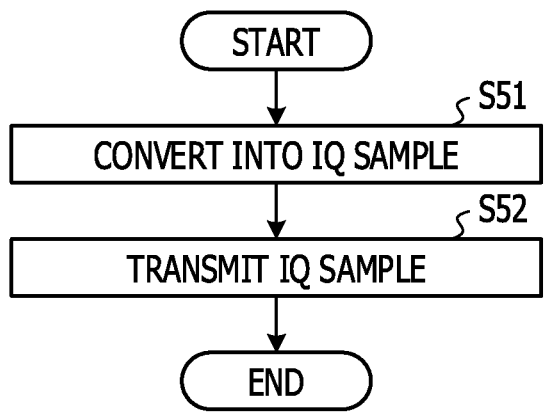
FIG. 17A is a flowchart representing an operation of the sensor terminal.

FIG. 17A is a flowchart representing an operation of the sensor terminal 10e. The front end unit 11 receives the GNSS satellite signal from the GNSS satellite as a snapshot, and converts the received GNSS satellite signal into a digital IQ sample (step S51). The transceiver 13 wirelessly transmits the IQ sample as a snapshot GNSS signal (step S52).

Figure 17B:
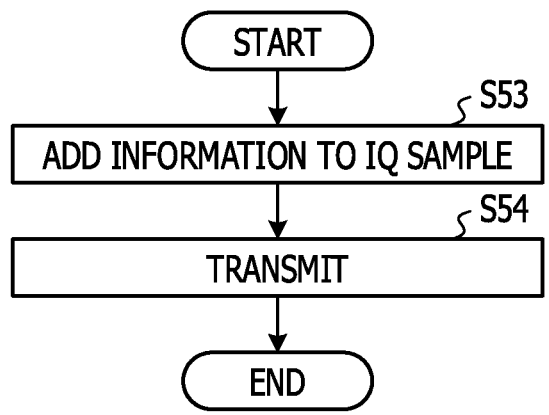
FIG. 17B is a flowchart representing an operation of the relay device.

FIG. 17B is a flowchart representing an operation of the relay device 20. The signal reception unit 21 receives the IQ sample and causes the storage device 22 to store the IQ sample. The GNSS reception unit 23 receives GNSS satellite signals from GNSS satellites. In this case, the GNSS reception unit 23 does not perform snapshot reception, but receives both the integer value and the decimal value of the signal propagation time. The measuring calculation unit 24 uses the GNSS satellite signal received by the GNSS reception unit 23 to calculate the position of the relay device 20 and causes the storage device 22 to store the position. The timer 25 causes the storage device 22 to store time information. The storage device 22 stores the position of the relay device 20 received from the measuring calculation unit 24 in association with the IQ sample to which the time information is added (step S53). For example, the storage device 22 adds the position of the relay device 20 to the IQ data to which the time information is added. The transmitter 26 transmits the information stored in the storage device 22 (step S54).

Figure 17C:
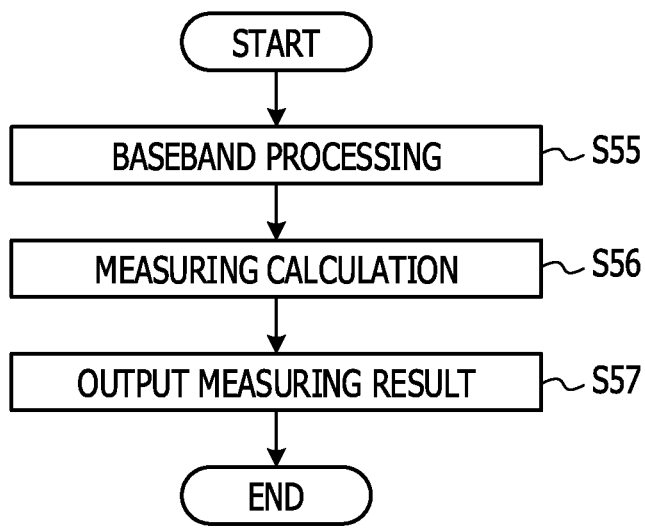
FIG. 17C is a flowchart representing an operation of the calculation device.

FIG. 17C is a flowchart representing an operation of the calculation device 30e. The baseband unit 31 calculates the raw data from the IQ samples received from the relay device 20 by baseband processing, and calculates the code phase and the Doppler frequency included in the raw data (step S55). Next, the calculation device 30e acquires satellite orbit information from another calculation device (server) over the net such as NASA, and performs measuring calculation together with the information transmitted from the relay device 20 (step S56). The measuring calculation is the same calculation as steps S6 to S8 in FIG. 4C. The calculation device 30e outputs the result of the measuring calculation (step S57).

The technique of providing the baseband unit in the calculation device 30 as in the present modification example may be applied to Modification Examples 1-1 to 1-4.

Second Embodiment

Figure 18:
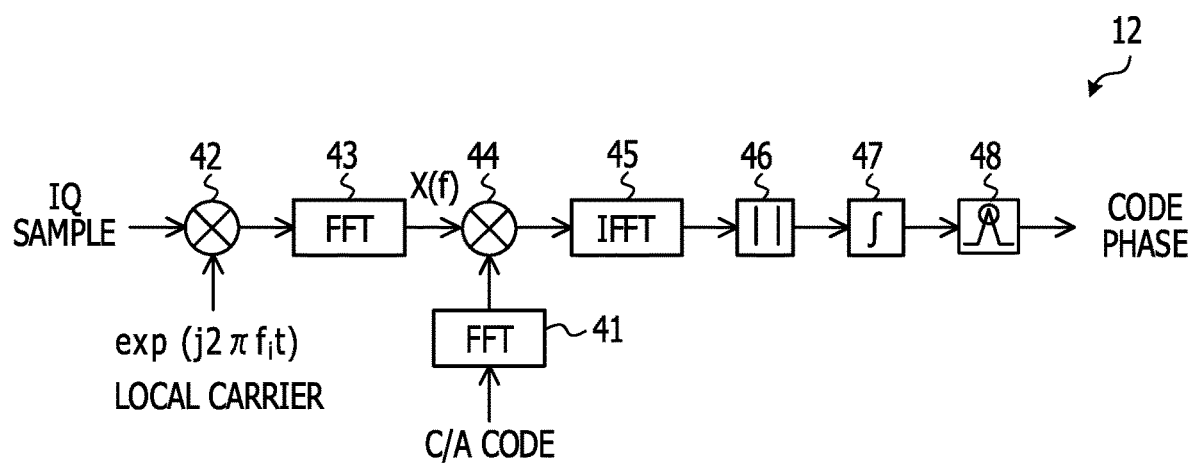
FIG. 18 is a diagram illustrating the details of a baseband unit.

In a second embodiment, details of the baseband unit of each example in the first embodiment will be described. FIG. 18 is a block diagram illustrating the details of the baseband unit 12. As illustrated in FIG. 18, the baseband unit 12 includes an FFT unit 41, a multiplication unit 42, an FFT unit 43, a multiplication unit 44, an IFFT unit 45, an absolute value extraction unit 46, an integration unit 47, a search unit 48, and the like. The baseband unit 12 calculates the code phase by performing a correlation calculation between a coarse/acquisition (C/A) code received from a GNSS satellite and a replica code (pseudo noise (PN) code) simulating the C/A code. The C/A code is a spreading code different for each GNSS satellite signal.

The FFT unit 41 performs Fourier transform on the C/A code. The multiplication unit 42 calculates the product of the IQ sample and the local carrier exp $(j2\pi f_i t)$. Thereby, the carrier may be removed. The FFT unit 43 performs Fourier transform on the calculation result of the multiplication unit 42. The multiplication unit 44 calculates the product of the calculation result of the FFT unit 41 and the calculation result of the FFT unit 43. The IFFT unit 45 performs inverse Fourier transform on the calculation result of the multiplication unit 44. The absolute value extraction unit 46 extracts the absolute value of the calculation result of the IFFT unit 45. The integration unit 47 integrates the absolute value extracted by the absolute value extraction unit 46. Accordingly, the correlation value for the phase is obtained. The search unit 48 searches for a correlation peak in the calculation result of the integration unit 47. The code phase and the Doppler frequency may be calculated by searching for the correlation peak.

In such a configuration, for example, if the processing of the FFT unit 41, the multiplication unit 42, the FFT unit 43, the multiplication unit 44, the IFFT unit 45, the absolute value extraction unit 46 and the integration unit 47 is performed by a field-programmable gate array (FPGA), the processing delay is approximately 1.8 msec. When the calculation result of the FFT unit 41 may be stored in the memory, the processing delay is reduced to about 1.3 msec. When the size of the Fourier transform is reduced by using Sparse FFT or the like, the processing delay is reduced to about 0.65 msec to 0.32 msec. On the other hand, when the correlation peak search by the search unit 48 is performed by a processor (for example, a microcomputer) different from the FPGA, the processing delay is increased to about 2.6 msec. From the above, it is preferable that processing delay of correlation peak search may be suppressed.

Figure 19:
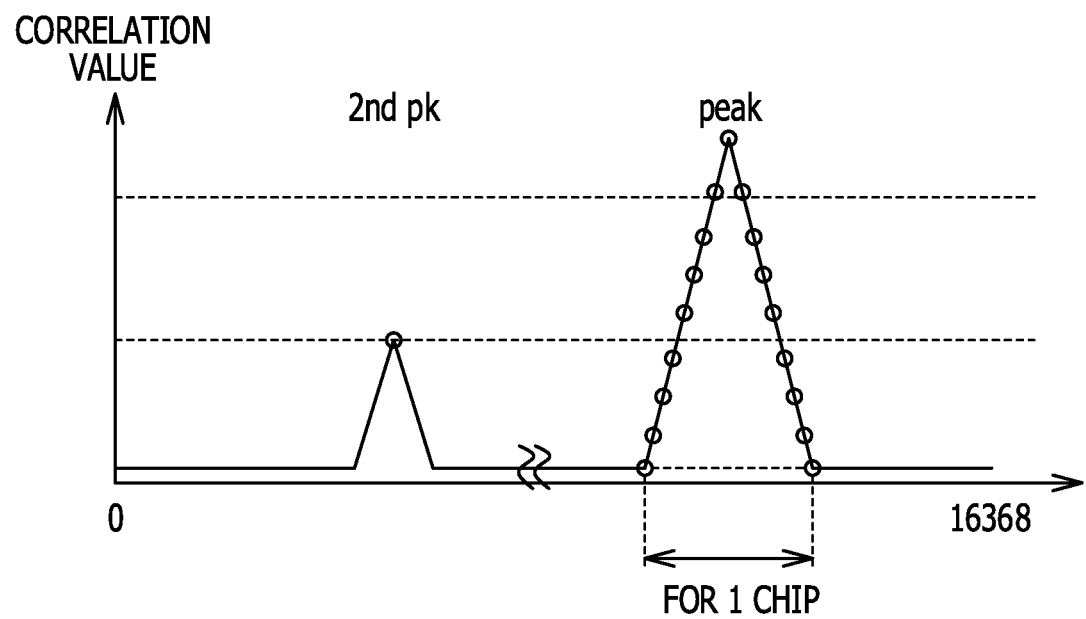
FIG. 19 is a diagram illustrating a result of a correlation calculation.

The peak search using the PN code will be described. FIG. 19 is a diagram illustrating the calculation result of the integration unit 47. In order to search for a correlation peak, correlation values are extracted at a predetermined sampling period. In order not to falsely detect noise, the maximum value of the largest peak and the maximum value of the second largest peak are searched. For example, assuming that the sampling frequency is 16.368 MS/s (×16 over sampling for 1.023 chip/s), and the maximum value of the largest peak exceeds a predetermined number (for example, 2.2 times) of the maximum value of the second largest peak, the largest peak is to be detected. In the example of FIG. 19, the correlation value of 16368 points is extracted. In this case, it takes about 1 msec.

Therefore, in the present embodiment, the search unit 48 performs a thinning search. The correlation peak of the PN code has a width of one chip, and has a shape close to an upwardly convex triangle. If this property is used, it is not required to search all sampling points. For example, it is possible to search for the true maximum value by searching for sampling points in a short section before and after the searched maximum value.

First, the 16386 sampling points are divided into a plurality of subsets, and peak search is performed on any one subset. For example, a sampling point that is the largest among the subsets is searched. It is divided into eight subsets in the example of FIGS. 20A to 20H. Each subset is extracted every eight sampling points. For example, the first subset is a set of first, ninth, seventeenth, . . . sampling points.

Next, a true peak is searched by acquiring correlation values in a predetermined range (for example, 0.5 chips) before and after the searched peak and acquiring the maximum value. In this case, the number of steps required for peak search is (16386/8+8)≈(⅛ of the original). By using this processing, it is not required to search for the second largest peak. If all the code phases of each GNSS satellite are transmitted to the relay device 20, it may be determined by the relay device 20 whether it is a visible satellite or not.

According to the present embodiment, it is possible to reduce the search processing amount of the maximum peak according to the number of subsets. It is not required to search for the second largest peak. From the above, it is possible to suppress the processing delay of the correlation peak search of the search unit 48.

Figure 21A:
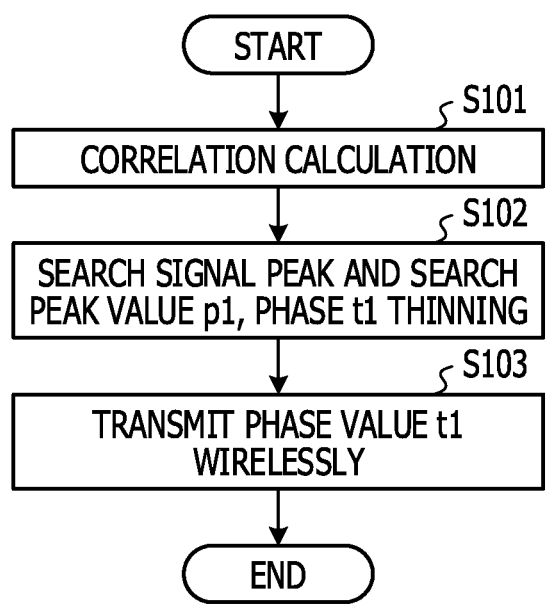
FIG. 21A is a flowchart representing correlation peak search processing by the sensor terminal.

FIG. 21A is a flowchart representing a correlation peak search processing by the sensor terminal 10. First, correlation calculation is performed by the FFT unit 41, the multiplication unit 42, the FFT unit 43, the multiplication unit 44, the IFFT unit 45, the absolute value extraction unit 46, and the integration unit 47 (step S101). Next, the search unit 48 searches for a signal peak on the correlation calculation result (step S102). In the processing, the thinning search described above is performed. For example, for all satellites, the peak value p1 is searched, and the code phase t1 is calculated from the peak value p1. Next, the transceiver 13 transmits the code phase t1 of all GNSS satellites (step S103).

Figure 21B:
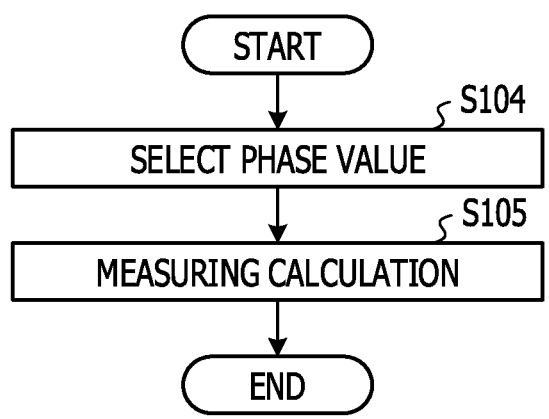
FIG. 21B is a flowchart representing measuring calculation processing by the calculation device.

FIG. 21B is a flowchart representing a measuring calculation processing by the calculation device 30. The calculation device 30 selects phase t1 using GNSS satellite information that relay device 20 has (step S104). For example, four to eight phases t1 are selected. Next, the calculation device 30 performs measuring calculation using the phase t1 selected in step S104 (step S105).

According to the present embodiment, by utilizing the property of the correlation result, the search range may be thinned when searching for the largest peak. Thereby, search processing may be reduced. It is not required to search for the second largest peak. From the above, it is possible to shorten the processing time for acquiring the code phase.

In the present embodiment, although FFT is used as the correlation calculation, it may be applied to other correlation operators. For example, the present embodiment may be applied to a time domain correlation calculator as disclosed in Japanese Laid-open Patent Publication No. 2011-220998.

The correlation peak search of the second embodiment may be applied to each baseband process of the first embodiment.

Third Embodiment

Figure 22:
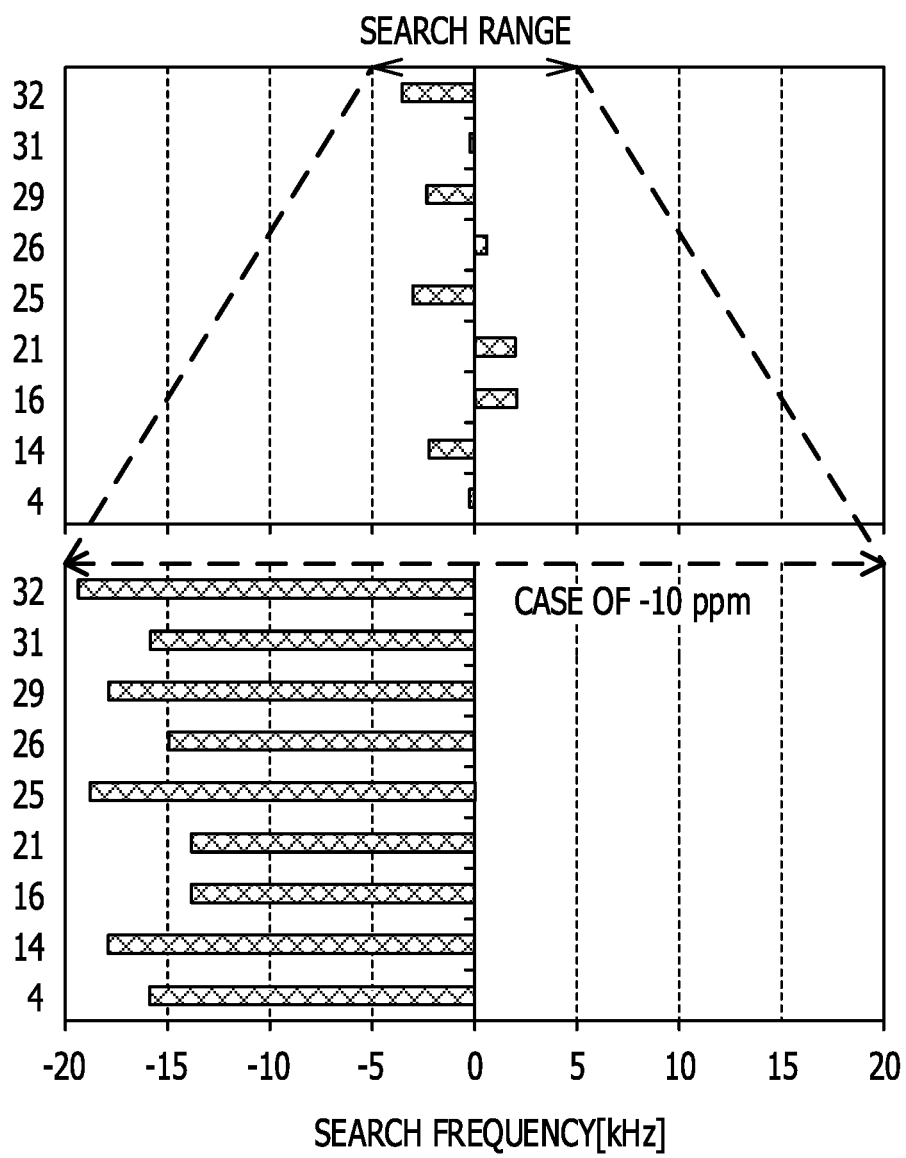
FIG. 22 is a diagram illustrating a frequency search range.

In the second embodiment, the processing for searching for the peak frequency and phase from the result of the correlation calculation has been described. As illustrated in FIG. 22, the frequency search range is the sum of the Doppler shift due to the motion of the satellite and the XO frequency error of the sensor terminal 10 provided with the baseband unit that performs baseband processing. If the sum is large, the frequency search range becomes wide, and the processing time becomes long. The sensor terminal 10 that performs Snapshot reception receives satellite signals for a short time of about several milliseconds to several tens of milliseconds, and satellite acquisition processing (baseband processing) is performed on the satellite signals. In this case, it is not possible to obtain the contents of the frame (satellite orbit information), the position of the frame itself, or the clock error, and it is not possible to correct the error of the crystal oscillator of its own. Therefore, it is required to perform a wide range of Doppler frequency searches each time, which increases the power consumption of the satellite acquisition processing. In the third embodiment, the structure which suppresses the power consumption of a satellite supplementary processing is described by suppressing the expansion of a frequency search range.

Figure 23:
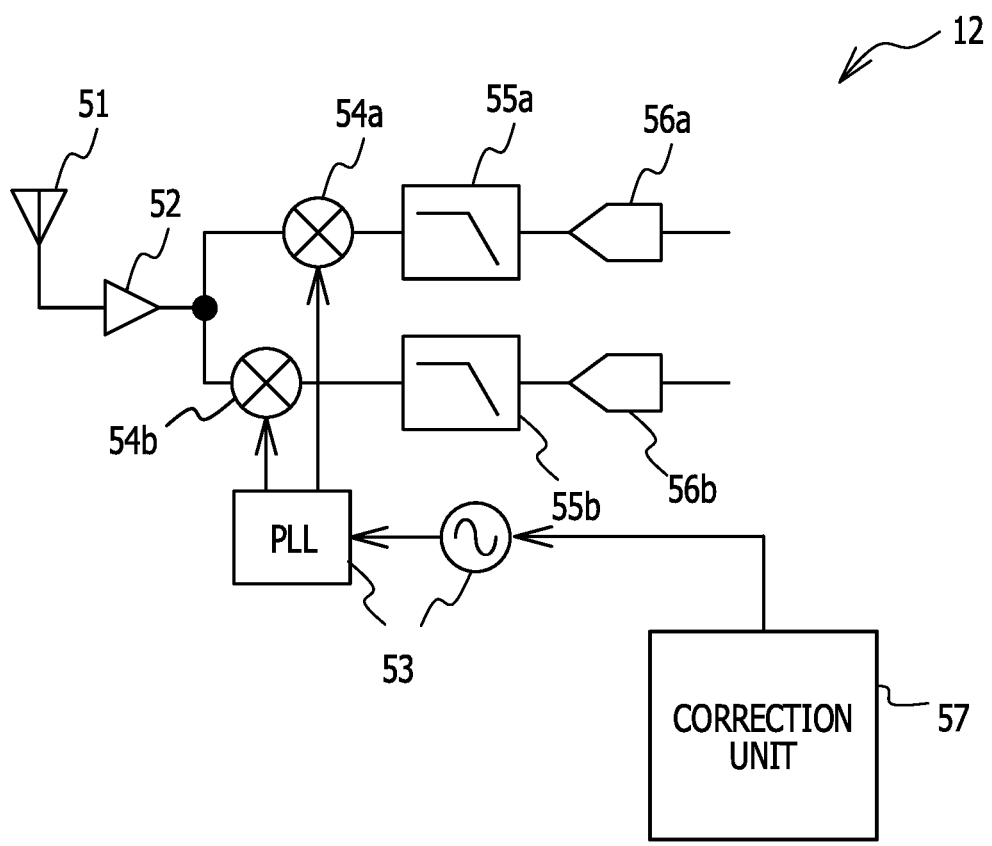
FIG. 23 is a block diagram illustrating details of a front end unit.

FIG. 23 is a block diagram illustrating the details of the front end unit 11. As illustrated in FIG. 23, the front end unit 11 includes an antenna 51, an LNA unit 52, a phase synchronization unit 53, mixing units 54a and 54b, low pass filters 55a and 55b, AD converters 56a and 56b, a correction unit 57, and the like.

The antenna 51 receives satellite signals as RF signals. The LNA unit 52 is a low noise amplifier, and amplifies the RF signal with low noise. The phase synchronization unit 53 generates an oscillation signal for RF signal multiplication by dividing or multiplying the clock signal of the XO frequency. The mixing units 54a and 54b down convert the RF signal into a signal (IF signal) of an intermediate frequency by multiplying the RF signal by the oscillation signal. The low pass filters 55a and 55b remove noise of the IF signal. The AD converters 56a and 56b convert the noise-removed IF signal into a digital signal. Thereby, an IQ sample is generated. The correction unit 57 corrects the XO frequency.

The satellite signal has a frequency of 1575.42 MHz±5 kHz. The ±5 kHz corresponds to the Doppler shift accompanying the movement of the satellite. The phase synchronization unit 53 operates at a clock frequency of 16.368 MHz. The local oscillation frequency (LO frequency) of the oscillation signal for RF signal multiplication output by the phase synchronization unit 53 is 1571.328 MHz. The IF frequency is affected by the Doppler shift. For example, the IF frequency is 4.092 MHz±5 kHz. This ±5 kHz corresponds to the Doppler shift. In this case, in order to find the correlation peak, for example, the frequency of the local carrier is swept in 500 Hz steps. Therefore, if there is no error in the XO frequency, the condition number of the sweep is 21.

On the other hand, it is assumed that the phase synchronization unit 53 operates at a clock frequency of 16.368 MHz±163.68 Hz. The ±163.68 Hz corresponds to ±10 ppm. The local oscillation frequency (LO frequency) of the oscillation signal for RF signal multiplication output by the phase synchronization unit 53 is 1571.328 MHz±15.7 kHz. The IF frequency is affected by the Doppler shift and the XO frequency shift. For example, the IF frequency is 4.092 MHz±5 kHz±15.7 kHz. The ±5 kHz corresponds to the Doppler shift, and ±15.7 kHz corresponds to the XO frequency shift. In this case, in order to find the correlation peak, for example, the frequency of the local carrier is swept in 500 Hz steps. Therefore, if there is no error in the XO frequency, the condition number of the sweep is 85.

Figure 24:
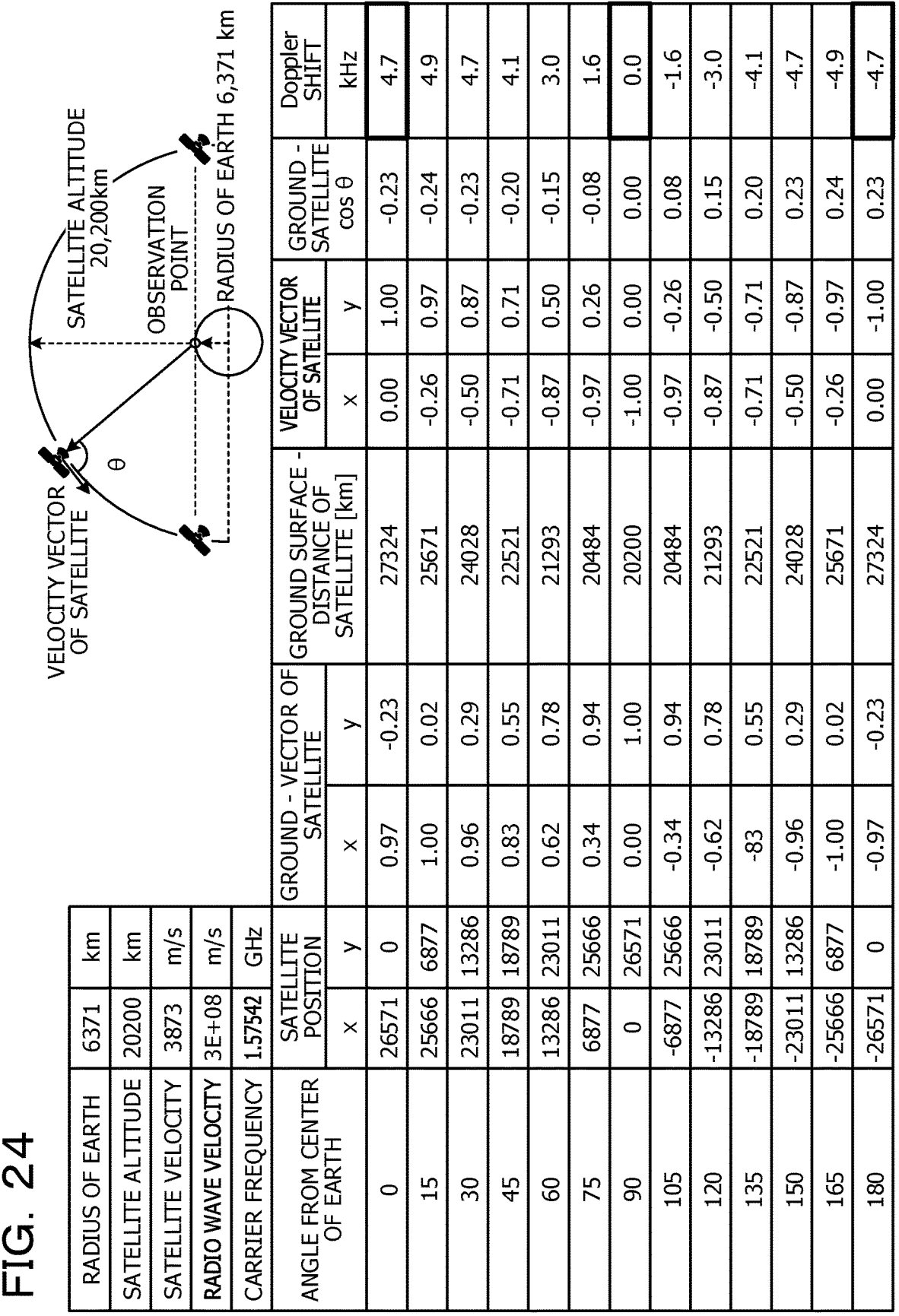
FIG. 24 is a diagram illustrating Doppler frequencies resulting from movement of a satellite.

FIG. 24 is a diagram illustrating Doppler frequencies resulting from movement of a satellite. As exemplified in FIG. 24, the Doppler effect v' on radio waves is v×{√/(1−(V/c)²)}/{1−(V/c)cos θ}. The angle θ is the angle between the line linking the observation point and the satellite and the velocity vector of the satellite. As the satellites move around the circumference around the center of the earth, the angle θ will change as the satellites move. The Doppler frequency is up to 4.7 kHz when the satellite rises from the horizon. When the satellite is located at the zenith, it will be approximately 0 Hz. If the satellites sink to the horizon, the minimum is −4.7 kHz. In the above equation v' represents the frequency of light at the observation point, and v represents the frequency of light output from the satellite. V represents the speed of the satellite viewed from the observation point. c represents the speed of light.

Figure 25A:
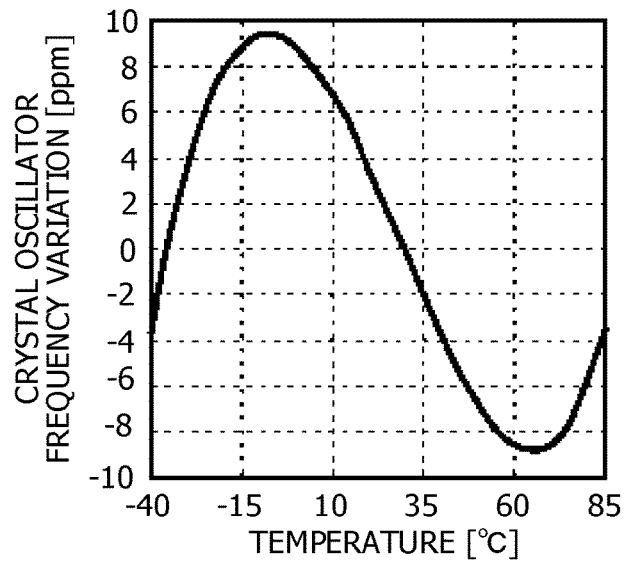
FIG. 25A is a diagram illustrating an XO frequency that varies with temperature.
Figure 25B:
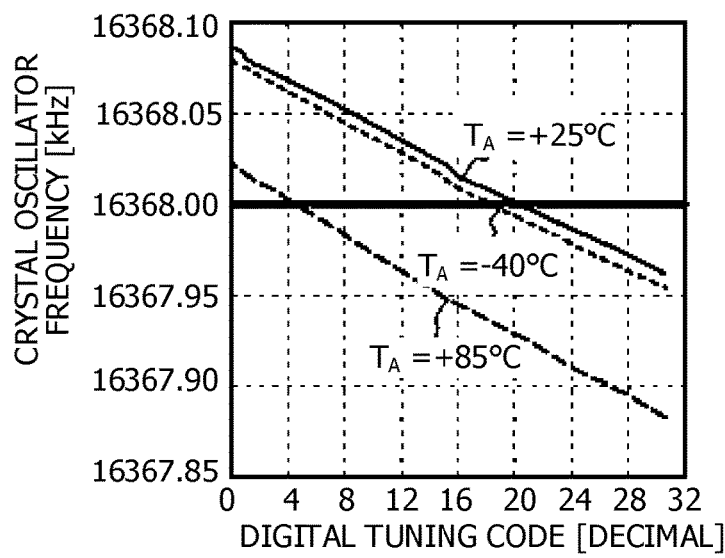
FIG. 25B is a diagram illustrating a frequency adjustment function.
Figure 25C:
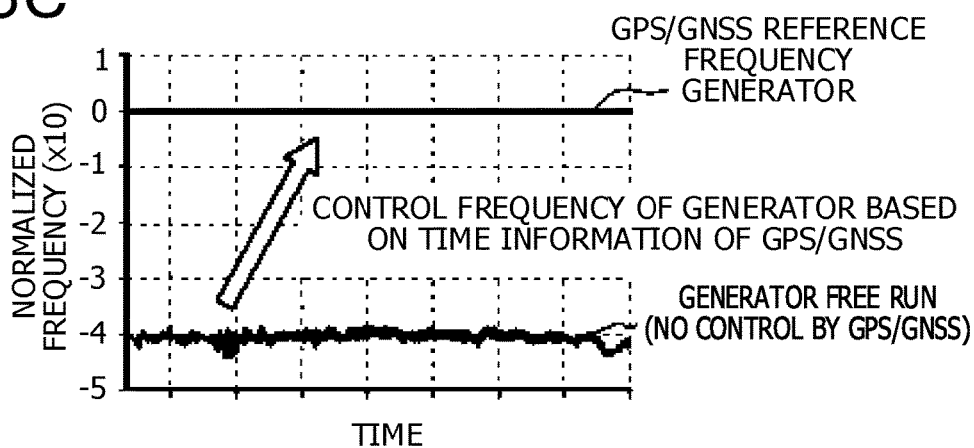
FIG. 25C is a diagram illustrating a case where frequency error is reduced to 0.5 ppm or less by operating the adjustment function.

As illustrated in FIG. 25A, the XO frequency fluctuates by about ±10 ppm according to the temperature. Problems may arise if the XO frequency is offset. Therefore, the GPS receiver has a function of adjusting to a desired frequency (for example, 16.368 MHz) as illustrated in FIG. 25B. FIG. 25C is a diagram illustrating a case where the frequency error is reduced to 0.5 ppm or less by operating the adjustment function. However, this correction operation is required for the GPS receiver to perform measuring calculation and to perform time correction of the receiver. It is difficult to perform the same correction calculation in the Snapshot receiver.

Figure 26:
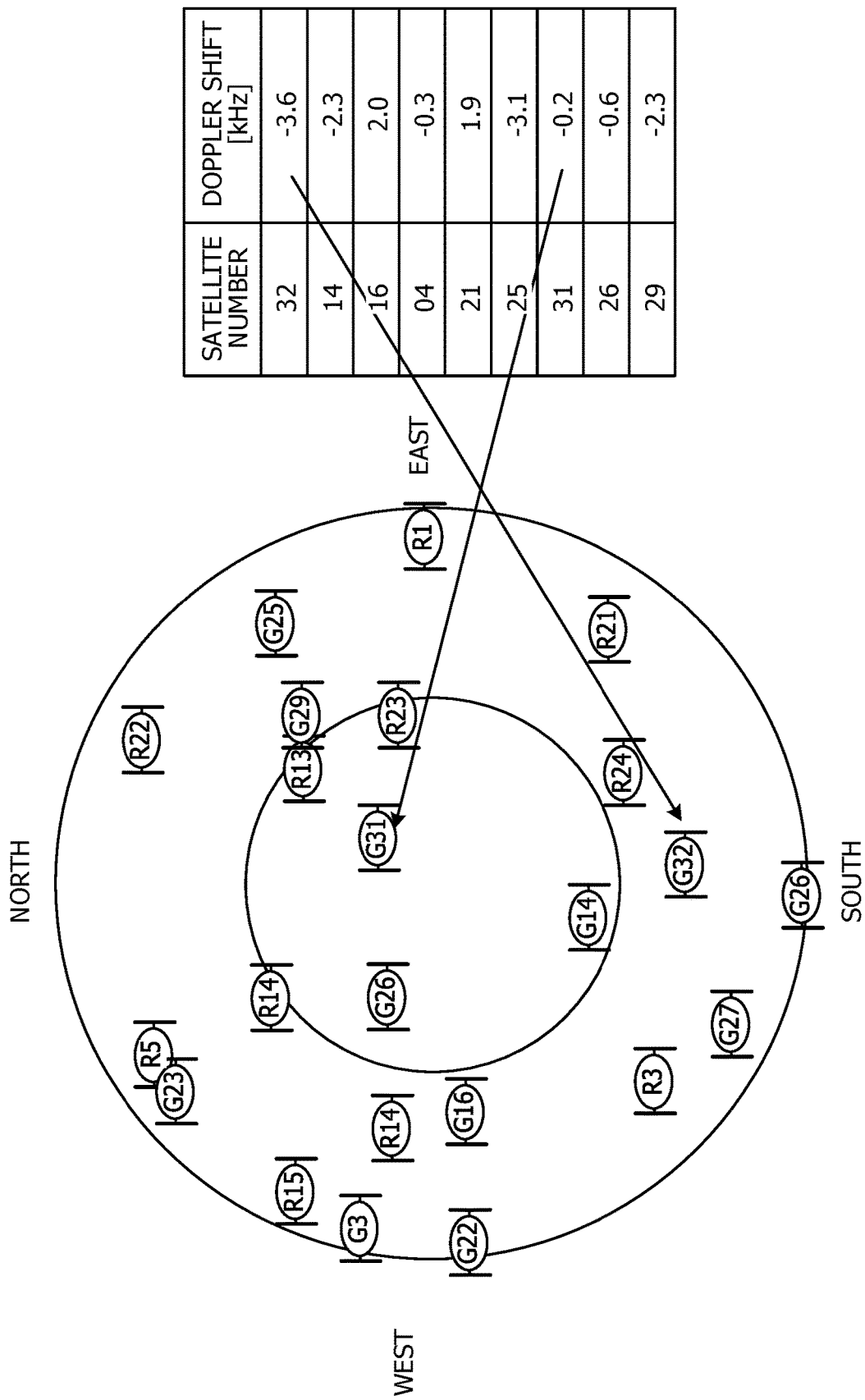
FIG. 26 is a diagram illustrating satellite Doppler shift.

FIG. 26 is a diagram illustrating satellite Doppler shift; As exemplified in FIG. 26, the Doppler shift of the satellite near the zenith has a value close to zero. On the other hand, the satellite's Doppler shift near the southern horizon has a large gap with −3.6 kHz.

The higher the accuracy of the crystal oscillator, the higher the price. In order to reduce the price of the sensor terminal 10, it is preferable to use low priced crystal. In the present embodiment, the influence of the frequency error may be suppressed even if low cost crystal is used. Details will be described below.

The sensor terminal 10 receives the GNSS satellite number and the value of the correct Doppler frequency as a table from the relay device 20 within a range of several kilometers using the transceiver 13. The sensor terminal 10 may receive the frequency step and the frequency bin. The baseband unit 12 sweeps the local carrier frequency for any satellite in the table (for example, satellite with the smallest absolute value of Doppler frequency) until acquisition is successful. The correction unit 57 calculates the XO frequency offset Δf_offset as the difference between the two. The baseband unit 12 performs satellite acquisition processing of the remaining frequencies using a value obtained by adding Δf_offset to each frequency described in the table. In order to reliably acquire a correlation peak, the frequency bin is 500 Hz, and the search range is around ±1 of the frequency bin. The baseband unit 12 changes the XO frequency by −Δf_offset until the next Snapshot is performed, and performs satellite acquisition processing only in the vicinity of the Doppler frequency notified from the relay device 20 in satellite acquisition processing from the next time.

For example, as illustrated in FIG. 27A, the sensor terminal 10 receives the Doppler frequency of each satellite from the relay device 20. In FIG. 27A, the vertical axis is the GNSS satellite number. The baseband unit 12 uses, as an example, the Doppler frequency (−0.2 kHz) of the satellite No. 31 having the smallest absolute value. Next, as illustrated in FIG. 27B, the baseband unit 12 performs a search for estimating the XO frequency error. When searching at ±16 kHz (65 conditions), satellite No. 31 may be captured. The correction unit 57 obtains the XO frequency error as −15.3 kHz<XO frequency error <−15.8 kHz.

Next, as illustrated in FIG. 27C, for the GNSS satellites other than the number 31, the frequency bin to be searched may be narrowed to three conditions. From the next time on, the baseband unit 12 may set the frequency bin to be searched as the three conditions for all satellites. Therefore, the amount of calculation for search may be reduced to about 1/30.

Figure 28:
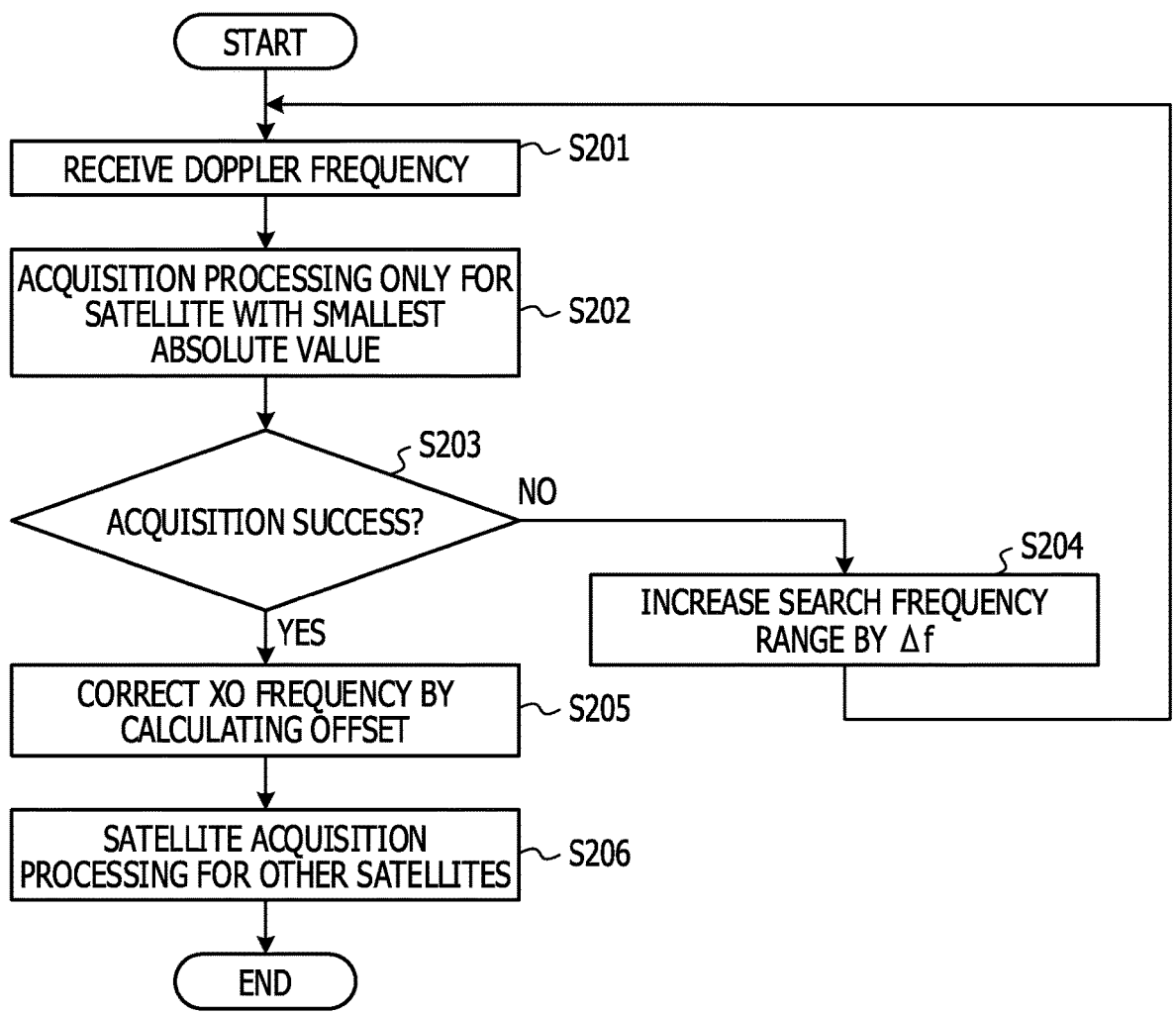
FIG. 28 is a flowchart representing an example of the operation of the sensor terminal.

FIG. 28 is a flowchart representing an example of the operation of the sensor terminal 10. As illustrated in FIG. 28, the transceiver 13 receives the Doppler frequency of each satellite from the relay device 20 (step S201). Next, the baseband unit 12 performs satellite acquisition processing only for the satellite with the smallest absolute value of the Doppler frequency (step S202). Next, the baseband unit 12 determines whether the satellite acquisition processing has succeeded in step S202 (step S203). If "No" is determined in step S203, the baseband unit 12 increases the search frequency range of the local carrier frequency by Δf (step S204). After execution of step S204, the process is performed again from step S201. The limit of increase in Δf may be predetermined according to the accuracy of the crystal being used. For example, when the increase in the search frequency range exceeds the limit, satellite acquisition processing may be performed on a satellite or the like having a next smallest absolute value of the Doppler frequency.

If "Yes" is determined in step S203, the correction unit 57 calculates the offset of the local carrier frequency as Δf_offset, and corrects the Doppler frequency of each satellite received from the relay device 20 using the Δf_offset (step S205). Next, the baseband unit 12 performs satellite acquisition processing for other satellites for which the Doppler frequency has been corrected (step S206).

Figure 29:
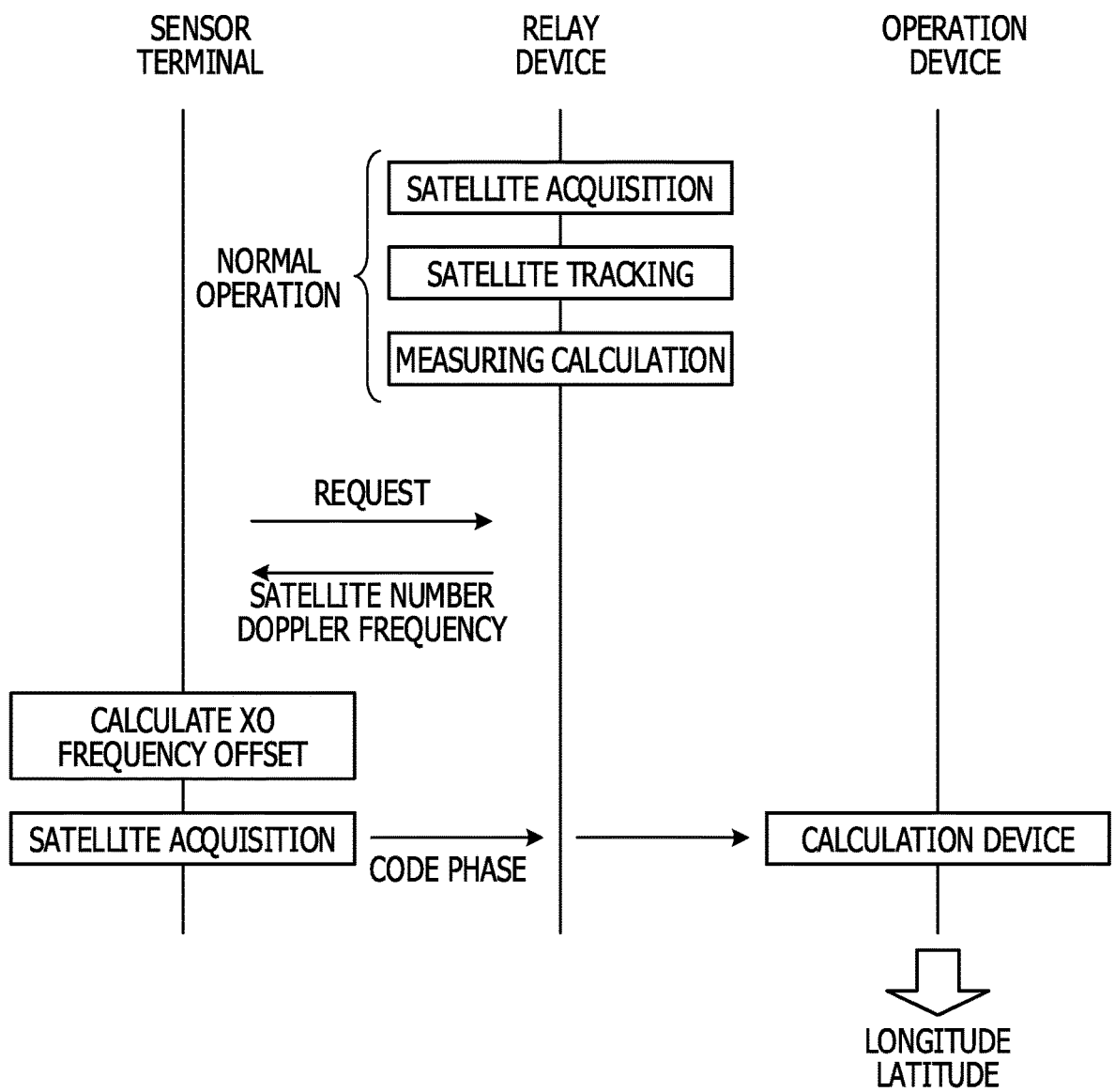
FIG. 29 is a diagram illustrating the flow of processing of each part of the position detection system.

FIG. 29 is a diagram illustrating the process flow of each part of the position detection system 100. As illustrated in FIG. 29, the relay device 20 normally performs satellite acquisition processing, satellite tracking processing, and own measuring calculation processing. A sensor terminal 10b requests the relay device 20 to transmit the GNSS satellite number and the Doppler frequency. Thereby, the sensor terminal 10 receives each GNSS satellite number and Doppler frequency from the relay device 20. The sensor terminal 10 calculates Δf_offset of the XO frequency using each GNSS satellite number and Doppler frequency received from the relay device 20. The sensor terminal 10 performs satellite acquisition processing of each GNSS satellite using the Δf_offset. Thereby, the code phase of each satellite may be calculated. The calculation device 30 calculates the position of the sensor terminal 10 from the calculated code phase and the position information of the relay device 20.

According to the present embodiment, the offset of the XO frequency may be calculated by performing satellite acquisition processing of any one of the GNSS satellites among the plurality of GNSS satellites. Thereby, the search frequency range in satellite acquisition processing of other GNSS satellites may be narrowed. Therefore, the amount of calculation of satellite acquisition processing of other GNSS satellites may be reduced. Although it is also possible to use each GNSS satellite number and Doppler frequency acquired in the calculation device 30 arranged at a location different from the relay device 20, it is preferable to use the GNSS satellite number and the Doppler frequency acquired by the relay device 20 when the difference in Doppler frequency between the calculation device 30 and the sensor terminal 10 becomes large.

Figure 30:
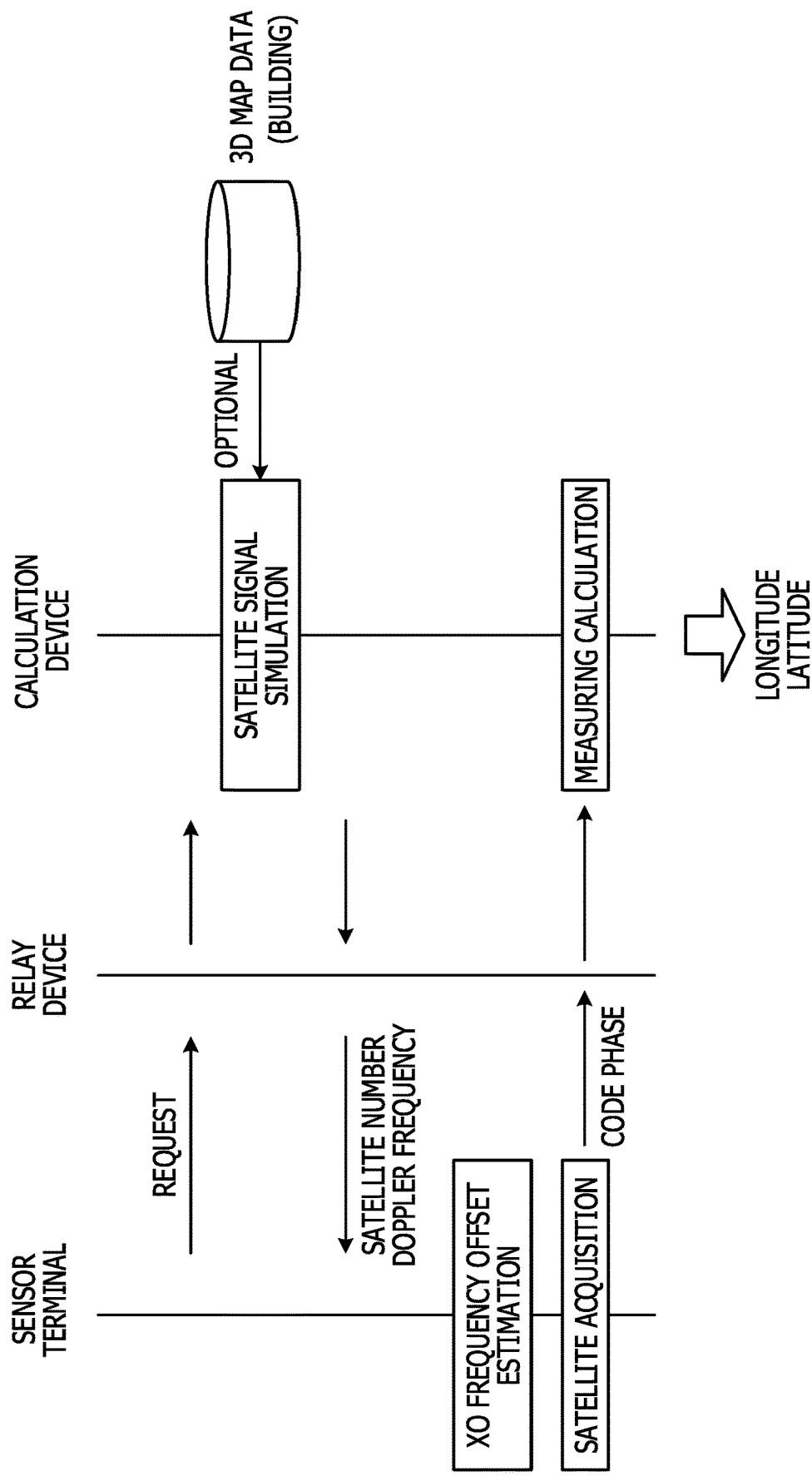
FIG. 30 is a diagram illustrating a case of using a simulation using three-dimensional data of buildings.

The calculation device 30 may calculate each GNSS satellite number and Doppler frequency. In this case, it is preferable to consider the influence of the shield and the like by the calculation device 30 performing simulation using building three-dimensional data and the like. For example, as illustrated in FIG. 30, it is possible to notify the sensor terminal 10 of an optimum result as to which GNSS satellite is to be subjected to satellite acquisition processing by using building three-dimensional data within the communication range of the relay device 20.

Modification Example 3-1

In Modification Example 3-1, the correction unit 57 of the sensor terminal 10 calculates the offset of the XO frequency without using the information from the relay device 20. For example, the range for sweeping the local carrier frequency is gradually increased until the baseband unit 12 captures any satellite. Assuming that the initial condition of the sweep range is ±5 kHz, and f0 (positive as an example) is the frequency at which satellite acquisition was initially successful, the range beyond ±5 kHz, for example, f0-5 kHz is considered to be attributable to part of the XO frequency offset. Since f0 is positive, it is only required to increase the sweep range in the positive direction thereafter. If f0 is negative, it may be increased only in the negative direction. Assuming that the sweep range is increased until a predetermined number of satellites required for measuring may be acquired, and the local carrier frequency at that time is f1, (f1-5) kHz becomes the XO frequency offset to be determined.

As exemplified in FIG. 31A, the Doppler frequency of any GNSS satellite exceeds ±5 kHz. Assuming that the Doppler frequency of the GNSS satellite No. 16 is −13.7 kHz, 29 conditions may be searched. On the other hand, GNSS satellite number 16 may be captured when the search range is expanded from ±5 kHz to ±14 kHz as illustrated in FIG. 31B. At least −8.5 kHz is known to be an XO frequency error. Assuming that this −14 kHz corresponds to the Doppler frequency=+5 kHz, if performing satellite acquisition processing for −10 kHz from here, all GNSS satellites may be captured as illustrated in FIG. 31C.

Figure 32:
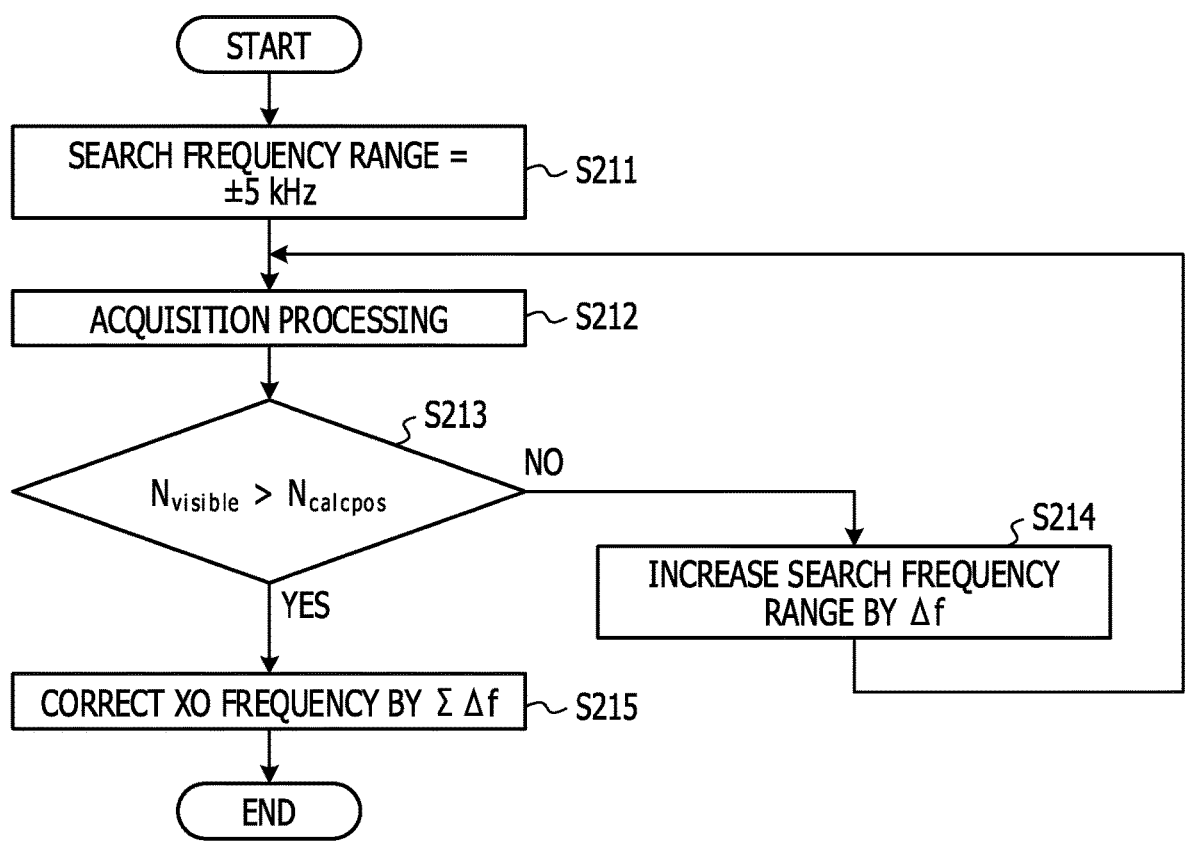
FIG. 32 is a flowchart representing an example of the operation of the sensor terminal.

FIG. 32 is a diagram illustrating a flowchart representing an example of the operation of the sensor terminal 10. As illustrated in FIG. 32, the baseband unit 12 designates the search frequency range of the local carrier to ±5 kHz (step S211). Next, the baseband unit 12 performs satellite acquisition processing in the designated search frequency range (step S212). Next, the baseband unit 12 determines whether or not the acquired GNSS satellite number $N_{VISIBLE}$ exceeds the GNSS satellite number $N_{CALPOS}$ required for measuring (step S213). If it is determined "No" in step S213, the baseband unit 12 increases the search frequency range by $\Delta f$ (step S214). Thereafter, the processing is executed again from step S212. If it is determined "Yes" in step S213, the correction unit 57 corrects the XO frequency by $\Sigma\Delta f$ (step S215).

According to the present modification example, the XO frequency may be corrected without acquiring the satellite information from the relay device 20.

Figure 33:
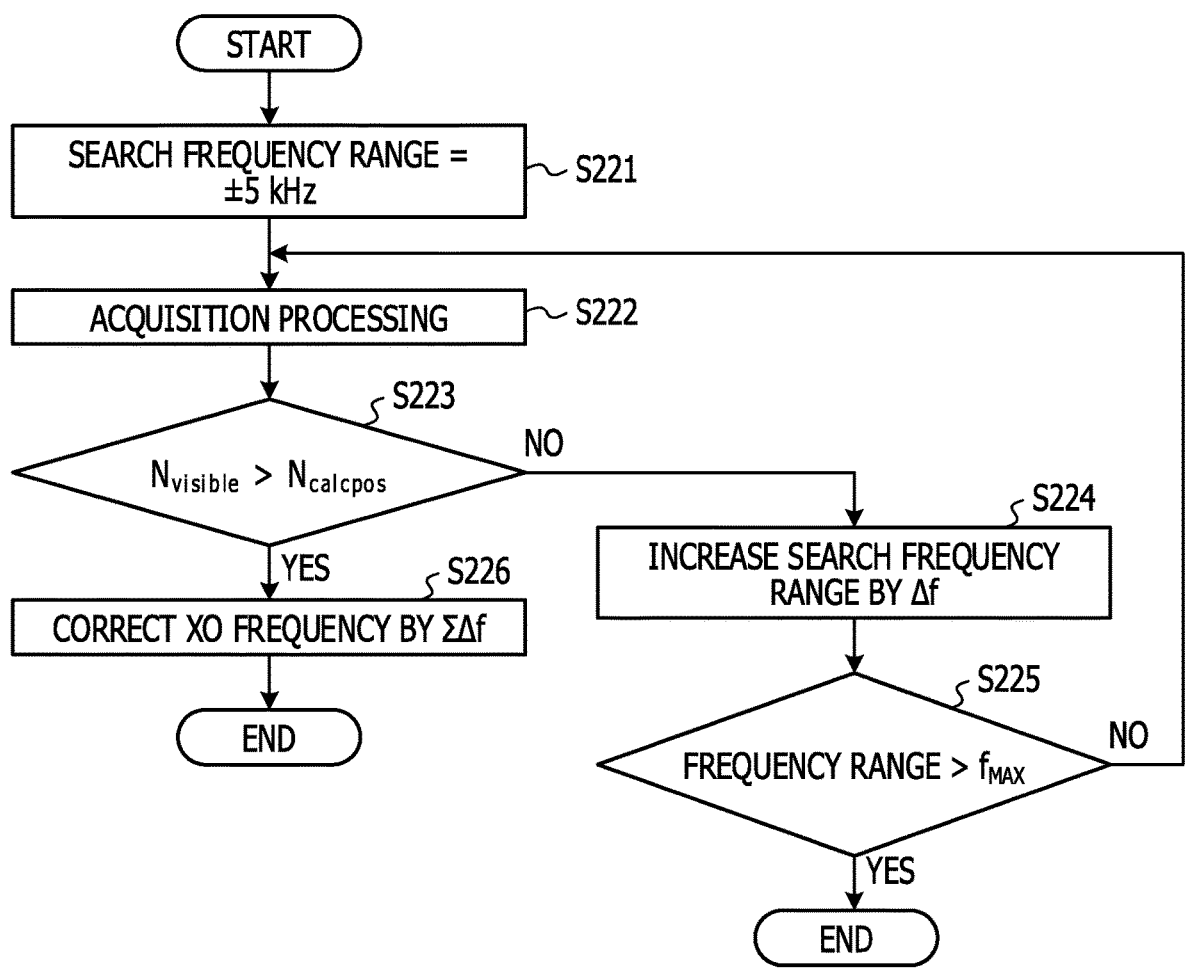
FIG. 33 is a diagram illustrating another example of the flowchart illustrating an example of the operation of the sensor terminal.

FIG. 33 is a diagram illustrating another example of the flowchart illustrating an example of the operation of the sensor terminal 10. As illustrated in FIG. 33, the baseband unit 12 designates the search frequency range of the local carrier to ±5 kHz (step S221). Next, the baseband unit 12 performs satellite acquisition processing in the designated search frequency range (step S222). Next, the baseband unit 12 determines whether or not the acquired GNSS satellite number $N_{VISIBLE}$ exceeds the GNSS satellite number $N_{CALPOS}$ required for measuring (step S223).

If "No" is determined in step S223, the baseband unit 12 increases the search frequency range by $\Delta f$ (step S224). Next, the baseband unit 12 determines whether the search frequency range exceeds the threshold $f_{MAX}$ (step S225). If it is determined "Yes" in step S225, the satellite supplementary processing is ended. If "No" is determined in the step S225, the processing is executed again from the step S222. If "Yes" is determined in step S223, the correction unit 57 corrects the XO frequency by $\Sigma\Delta f$ (step S226).

According to the present modification example, the satellite acquisition processing ends when the number of GNSS satellites required for measuring may not be obtained by setting a limit in the search frequency range. Accordingly, unrequired power consumption may be suppressed. For example, when the sensor terminal 10 is indoors, in a tunnel, or the like, unrequired power consumption may be suppressed.

Figure 34A:
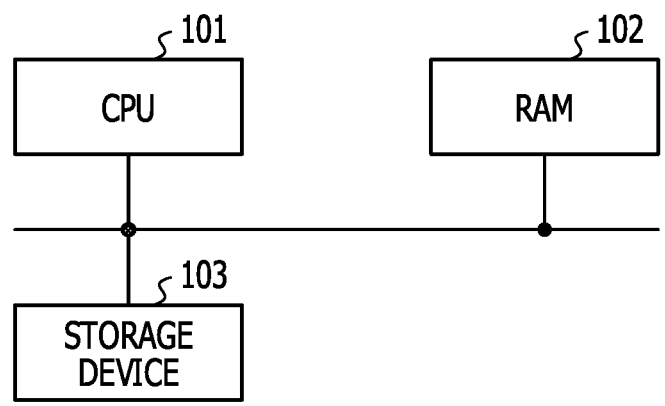
FIG. 34A is a block diagram for explaining another example of a hardware configuration of the baseband unit.

FIG. 34A is a block diagram for explaining another example of the hardware configuration of the baseband units 12, 27, and 31. For example, the baseband units 12, 27, and 31 include a central processing unit (CPU) 101, a random-access memory (RAM) 102, a storage device 103, and the like. The CPU 101 is a central processing unit. The CPU 101 includes one or more cores. A RAM 102 is a volatile memory that temporarily stores a program executed by the CPU 101, data processed by the CPU 101, and the like. The storage device 103 is a non-volatile storage device. As the storage device 103, for example, a read-only memory (ROM), a solid state drive (SSD) such as a flash memory, a hard disk driven by a hard disk drive, or the like may be used. The storage device 103 stores a program. Each unit of the baseband units 12, 27, and 31 may be realized by the CPU 101 executing an information processing program stored in the storage device 103.

Figure 34B:
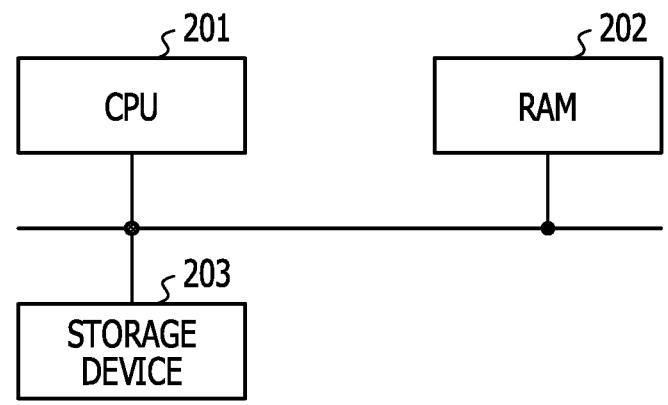
FIG. 34B is a block diagram for describing a hardware configuration of the calculation device.

FIG. 34B is a block diagram for describing a hardware configuration of the calculation device 30. For example, the calculation device 30 includes a CPU 201, a RAM 202, a storage device 203, and the like. The CPU 201 is a central processing unit. The CPU 201 includes one or more cores. A RAM 202 is a volatile memory that temporarily stores a program executed by the CPU 201, data processed by the CPU 201, and the like. The storage device 203 is a non-volatile storage device. As the storage device 203, for example, a ROM, an SSD such as a flash memory, a hard disk driven by a hard disk drive, or the like may be used. The storage device 203 stores a program. The functions of the calculation device 30 may be realized by the CPU 201 executing an information processing program stored in the storage device 203.

In each of the above examples, the sensor terminals 10, 10a, 10d, and 10e are an example of a GNSS sensor terminal that receives a satellite signal from a GNSS satellite as a snapshot. The relay devices 20 and 20d are an example of one or more relay devices for receiving a snapshot GNSS signal transmitted by the GNSS sensor terminal. It is an example of the calculation device that the calculation device 30 performs measuring of the position of the GNSS sensor terminal using the code phase and Doppler frequency of the GNSS satellite obtained from the snapshot GNSS signal, and the initial position of the GNSS sensor terminal is estimated using position information of the relay device that has received the snapshot GNSS signal transmitted by the GNSS sensor terminal.

As mentioned above, although the embodiments of the present disclosure have been described in detail, the embodiments are not limited to the specific embodiment, and various modifications and changes may be made within the scope of the present embodiments described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A position detection system comprising:
a Global Navigation Satellite System (GNSS) sensor terminal that receives a satellite signal from a GNSS satellite as a snapshot;
at least one relay device that receives the snapshot GNSS signal transmitted by the GNSS sensor terminal; and
a calculation device that measures a position of the GNSS sensor terminal by using a code phase and a Doppler frequency of the GNSS satellite obtained from the snapshot GNSS signal,
wherein the calculation device estimates an initial position of the GNSS sensor terminal by using position information of the relay device that has received the snapshot GNSS signal transmitted by the GNSS sensor terminal,
wherein one of the GNSS sensor terminal, the relay device, and the calculation device includes a baseband processing circuit that calculates the code phase and the Doppler frequency from the snapshot GNSS signal,
wherein the baseband processing circuit searches for peaks of correlation values by dividing a search range into a plurality of subsets to search for a sampling point having a correlation value equal to or higher than a threshold in any of the subsets, and searching for a predetermined range before and after the sampling point having a correlation value equal to or higher than the threshold, when searching for the code phase from the correlation value obtained by performing correlation calculation on In-Phase/Quadrature-Phase (IQ) samples.

2. The position detection system according to claim 1, wherein the GNSS sensor terminal adds, to the snapshot GNSS signal, time information at a time when the GNSS satellite signal from the GNSS satellite is received as a snapshot.

3. The position detection system according to claim 1, wherein when three or more relay devices receive the snapshot GNSS signal from the GNSS sensor terminal, the position of the GNSS sensor terminal is estimated using a received signal strength indicator (RSSI) in the three or more relay devices.

4. The position detection system according to claim 1, wherein the GNSS sensor terminal includes a baseband processing circuit that calculates the code phase and the Doppler frequency from the snapshot GNSS signal, the baseband processing circuit calculates own XO frequency offset based on a comparison between any satellite signal acquired by the relay device and the satellite signal acquired by the baseband processing circuit, and captures other satellite signals using the XO frequency offset.

5. The position detection system according to claim 1, wherein the GNSS sensor terminal includes a baseband processing circuit that calculates the code phase and the Doppler frequency from the snapshot GNSS signal, the baseband processing unit captures a satellite signal while expanding a search frequency range of a local carrier signal by a predetermined increment value, and captures other satellite signals by using an expanded width of the search frequency range when the satellite signal is capturable.

6. The position detection system according to claim 1, wherein the sensor terminal includes:
a receiver configured to receive the satellite signal from the GNSS satellite as the snapshot;
a baseband circuit configured to calculate the code phase and the Doppler frequency of the GNSS satellite from the satellite signal; and
a transmitter configured to transmit the code phase and the Doppler frequency to the at least one relay device.

7. A position detection device comprising:
a memory; and
a circuitry coupled to the memory, the circuitry configured to:
measure a position of a Global Navigation Satellite System (GNSS) sensor terminal by using a code phase and a Doppler frequency of a GNSS satellite obtained from a snapshot GNSS signal transmitted by the GNSS sensor terminal that receives the satellite signal from the GNSS satellite as a snapshot,
estimate an initial position of the GNSS sensor terminal by using position information of a relay device that has received the snapshot GNSS signal transmitted by the GNSS sensor terminal, and
calculate the code phase and the Doppler frequency from the snapshot GNSS signal in any one of the GNSS sensor terminal, the relay device, and the calculation device,
wherein: a processing to calculate the code phase searches for peaks of correlation values by dividing a search range into a plurality of subsets to search for a sampling point having a correlation value equal to or higher than a threshold in any of the subsets, and searching for a predetermined range before and after the sampling point having the correlation value equal to or higher than the threshold, when searching for the code phase from the correlation value obtained by performing correlation calculation on In-Phase/Quadrature-Phase (IQ) samples.

8. A position detection method comprising:
receiving a satellite signal from a Global Navigation Satellite System (GNSS) satellite as a snapshot by a GNSS sensor terminal; receiving the snapshot GNSS signal transmitted by the GNSS sensor terminal by at least one relay device;
measuring a position of the GNSS sensor terminal by using a code phase and a Doppler frequency of the GNSS satellite obtained from the snapshot GNSS signal;
estimating an initial position of the GNSS sensor terminal using position information of the relay device that has received the snapshot GNSS signal transmitted by the GNSS sensor terminal, when measuring the GNSS sensor terminal; and
calculating the code phase and the Doppler frequency from the snapshot GNSS signal in any one of the GNSS sensor terminal, the relay device, and the calculation device,
wherein: a processing of calculating the code phase searches for peaks of correlation values by dividing a search range into a plurality of subsets to search for a sampling point having a correlation value equal to or higher than a threshold in any of the subsets, and searching for a predetermined range before and after the sampling point having the correlation value equal to or higher than the threshold, when searching for the code phase from the correlation value obtained by performing correlation calculation on In-Phase/Quadrature-Phase (IQ) samples.

9. The position detection method according to claim 8, further comprising:
in the GNSS sensor terminal, adding, to the snapshot GNSS signal, time information at a time when the satellite signal from the GNSS satellite is received as a snapshot, in the GNSS sensor terminal.

10. The position detection method according to claim 8, wherein: in the process of estimating the initial position, when three or more relay devices receive the snapshot GNSS signal from the GNSS sensor terminal, the initial position of the GNSS sensor terminal is estimated using received signal strength indicators (RSSIs) of the three or more relay devices.

* * * * *